(12) United States Patent
Kakino et al.

(10) Patent No.: US 7,873,932 B2
(45) Date of Patent: Jan. 18, 2011

(54) METHOD FOR ANALYZING COMPONENT MOUNTING BOARD

(75) Inventors: Manabu Kakino, Nara (JP); Toru Okazaki, Osaka (JP); Teppei Iwase, Osaka (JP); Kazunori Takada, Osaka (JP); Hiroaki Fujiwara, Osaka (JP); Tomoaki Kuroishi, Hyogo (JP)

(73) Assignee: Panasonic Corporation, Osaka (JP)

( * ) Notice: Subject to any disclaimer, the term of this patent is extended or adjusted under 35 U.S.C. 154(b) by 613 days.

(21) Appl. No.: 11/885,831

(22) PCT Filed: Jan. 20, 2006

(86) PCT No.: PCT/JP2006/300834

§ 371 (c)(1),
(2), (4) Date: Sep. 7, 2007

(87) PCT Pub. No.: WO2006/095498

PCT Pub. Date: Sep. 14, 2006

(65) Prior Publication Data

US 2008/0168413 A1    Jul. 10, 2008

(30) Foreign Application Priority Data

| Mar. 10, 2005 | (JP) | ............................. 2005-066935 |
| Jul. 12, 2005 | (JP) | ............................. 2005-202372 |
| Sep. 16, 2005 | (JP) | ............................. 2005-269312 |

(51) Int. Cl.
*G06F 17/50* (2006.01)

(52) U.S. Cl. .............................. 716/15; 716/12; 716/19

(58) Field of Classification Search .................. 716/12, 716/15, 19
See application file for complete search history.

(56) References Cited

U.S. PATENT DOCUMENTS

| 6,753,253 | B1 * | 6/2004 | Takahashi et al. ........... 438/676 |
| 7,139,678 | B2 | 11/2006 | Kobayashi et al. .......... 702/183 |
| 2003/0055612 | A1 | 3/2003 | Amakai et al. ................. 703/1 |

FOREIGN PATENT DOCUMENTS

| JP | 2000-304630 | 11/2000 |
| JP | 2004-013437 | 1/2004 |
| JP | 2004-227337 | 8/2004 |
| JP | 2006-53747 | 2/2006 |

* cited by examiner

*Primary Examiner*—Thuan Do
(74) *Attorney, Agent, or Firm*—Steptoe & Johnson LLP

(57) ABSTRACT

A method for analyzing a component mounting board comprising a step (A) for forming a multilayer substrate shell model of a multilayer wiring board, a step (B) for forming a multilayer component shell model divided by element division lines based on the bonding position of a component to the surface of the multilayer wiring board, step (C) for redividing the mounting position of the component in the multilayer substrate shell model, and step (D) for forming an analysis model by bonding the neutral plane of the substrate and the neutral plane of the component through one of a beam element and a solid element, i.e. a bonding element equivalent to mounting conditions of the component, wherein precision of analysis is enhanced while reducing computation cost by performing calculation while imparting boundary conditions to the analysis model.

3 Claims, 27 Drawing Sheets

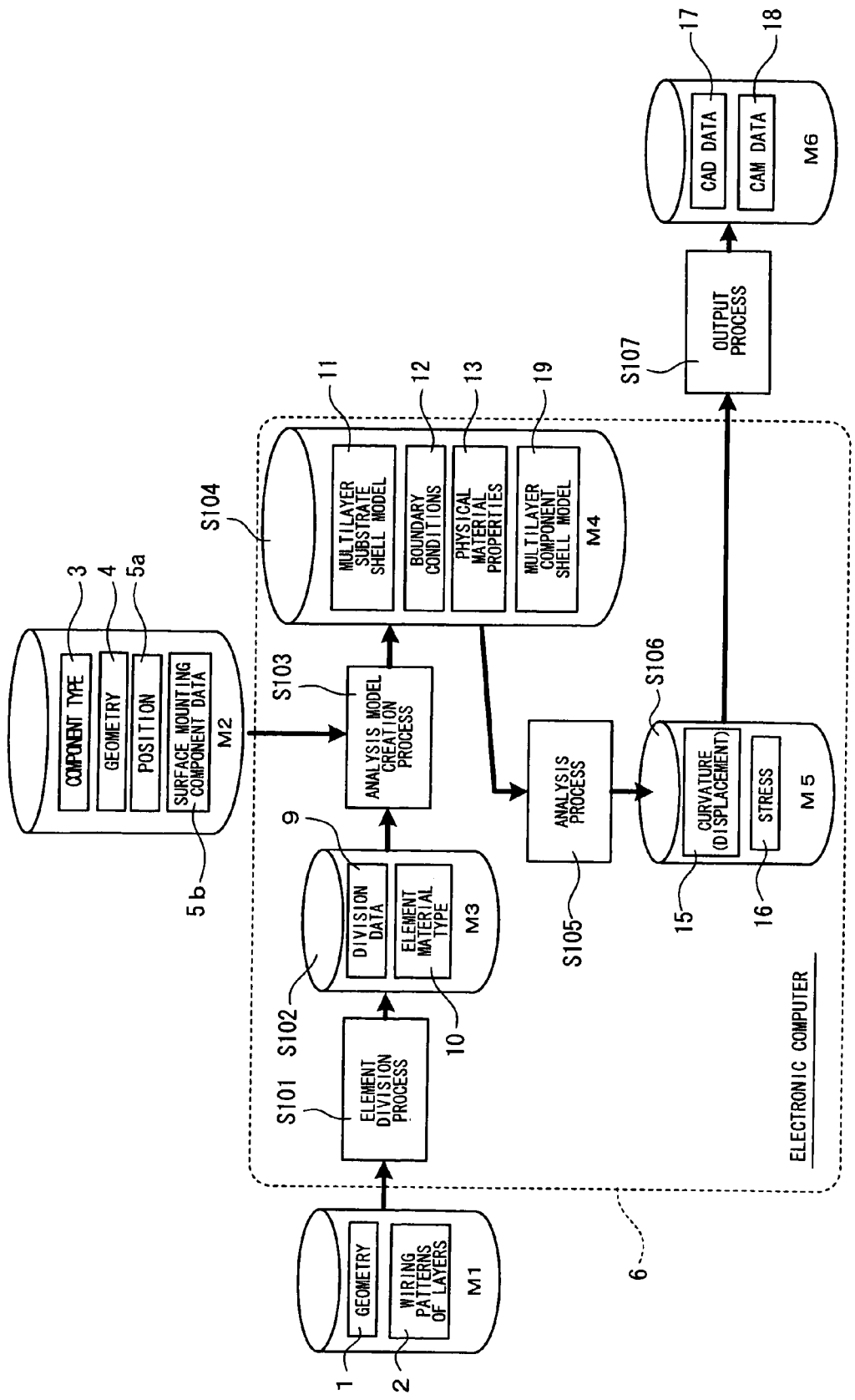

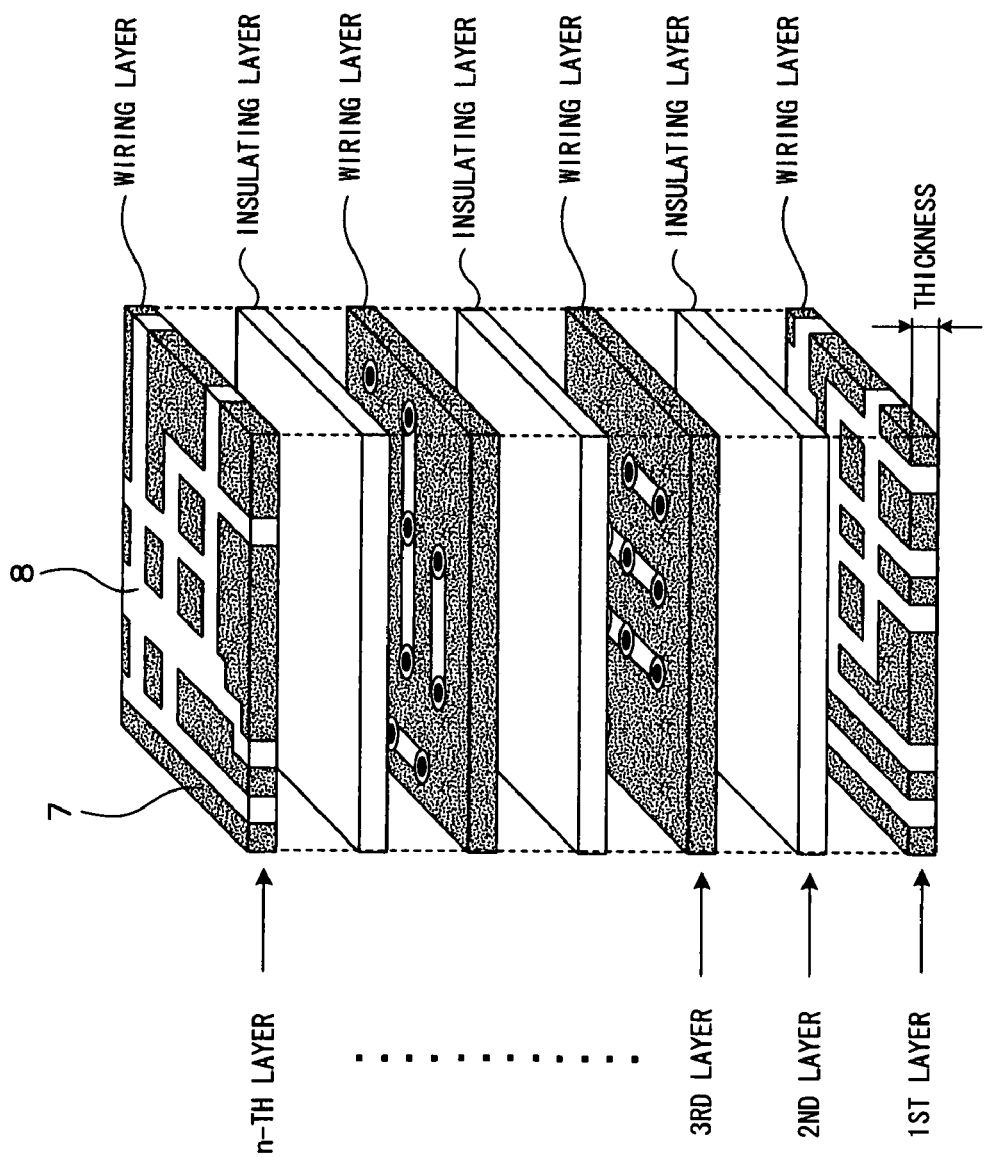

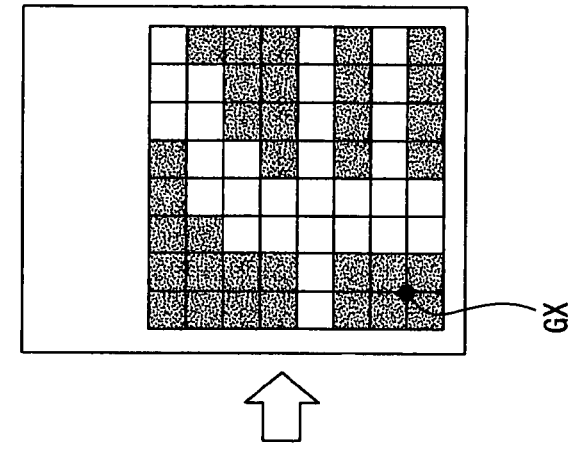
FIG. 3(d) MATERIAL TYPE ASSIGNMENT
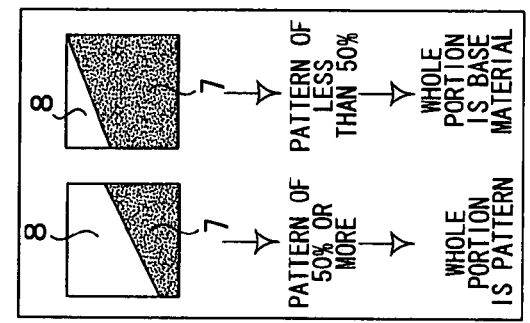
FIG. 3(c) ELEMENT MATERIAL DETERMINATION
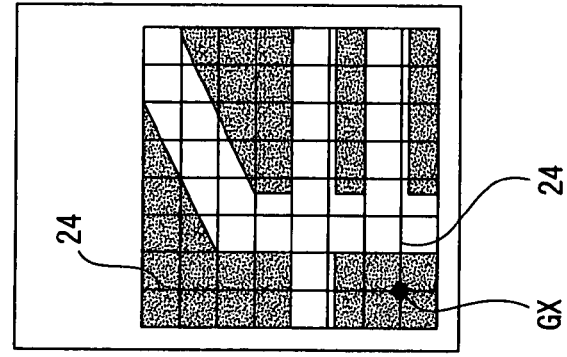
FIG. 3(b) ELEMENT DIVISION
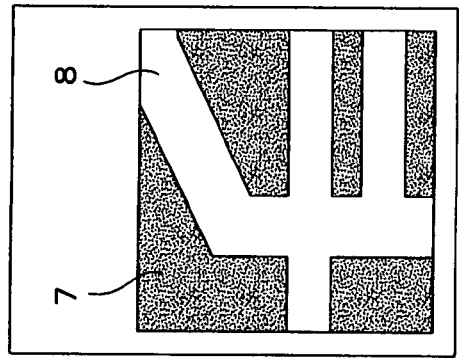
FIG. 3(a) WIRING PATTERN OF EACH LAYER

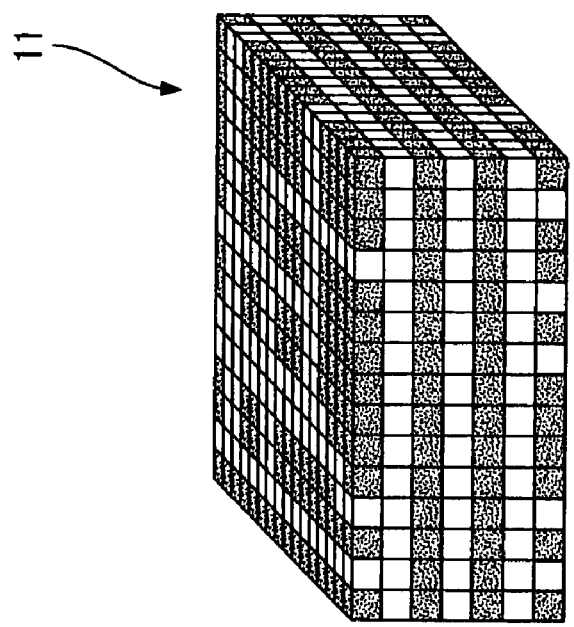
FIG. 4(b)
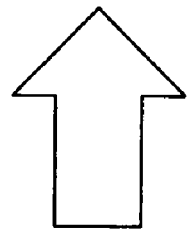
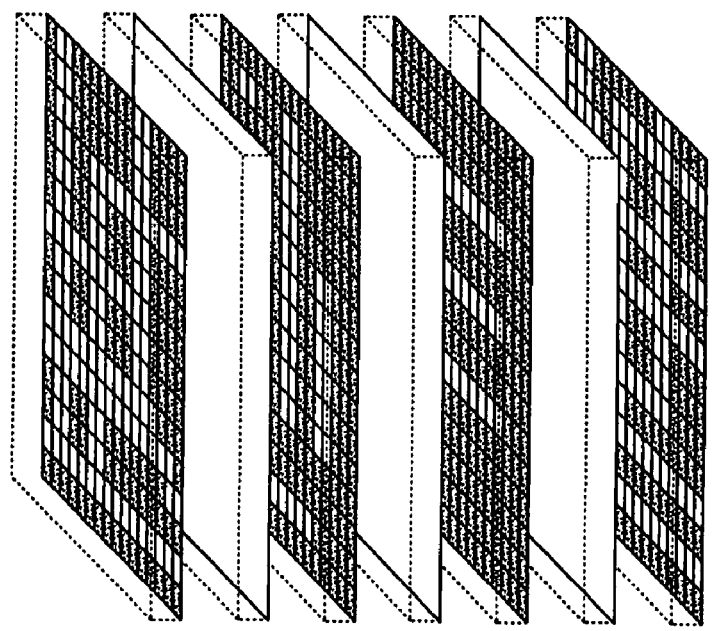
FIG. 4(a)

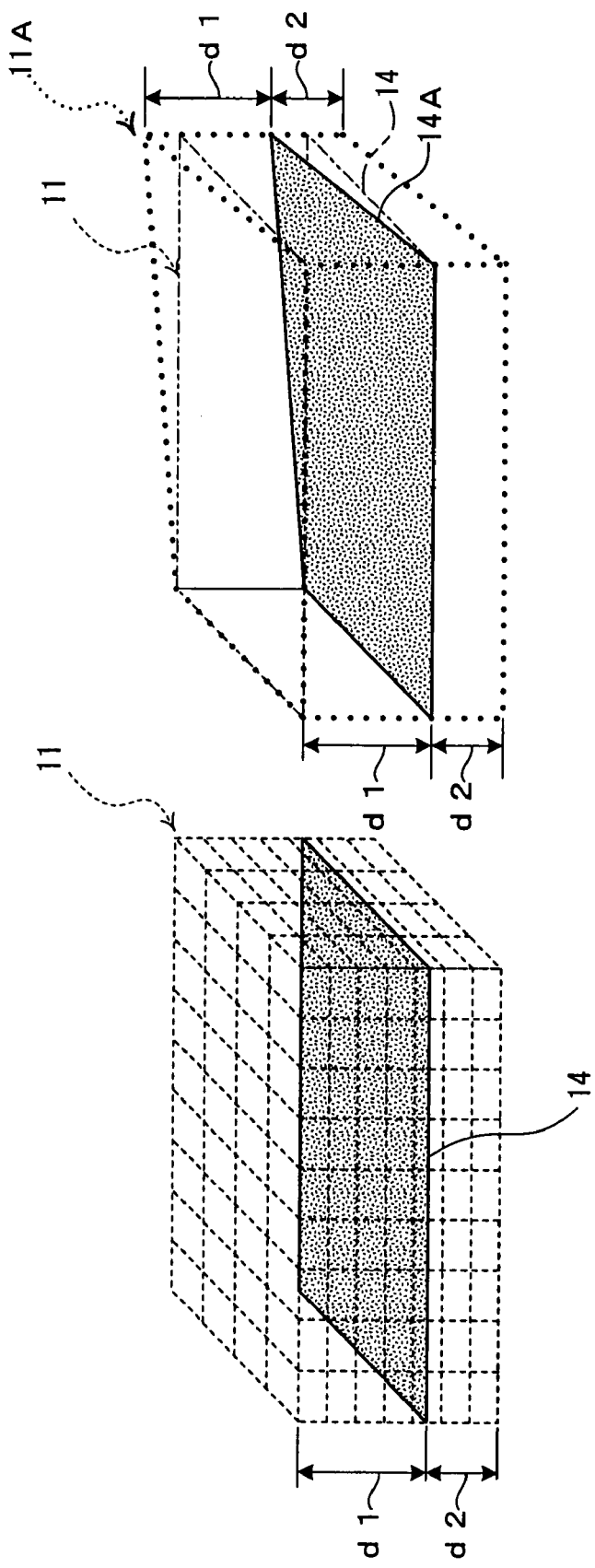

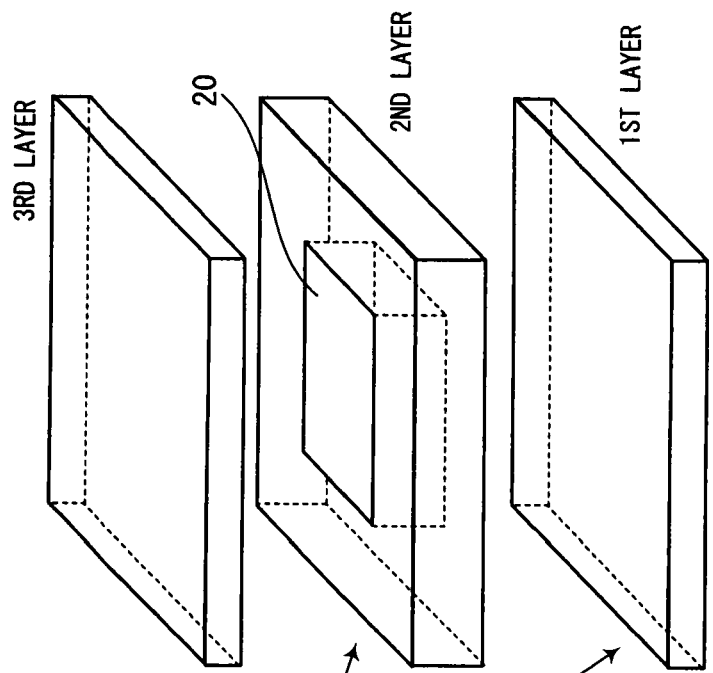
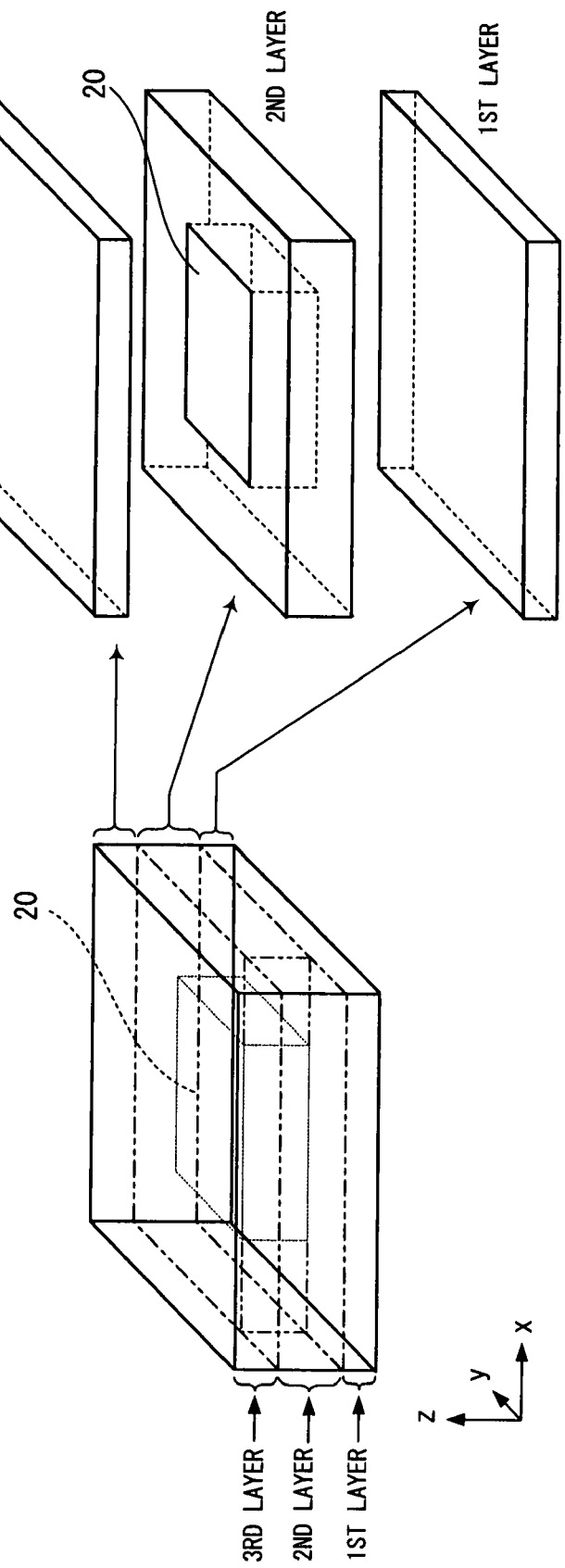

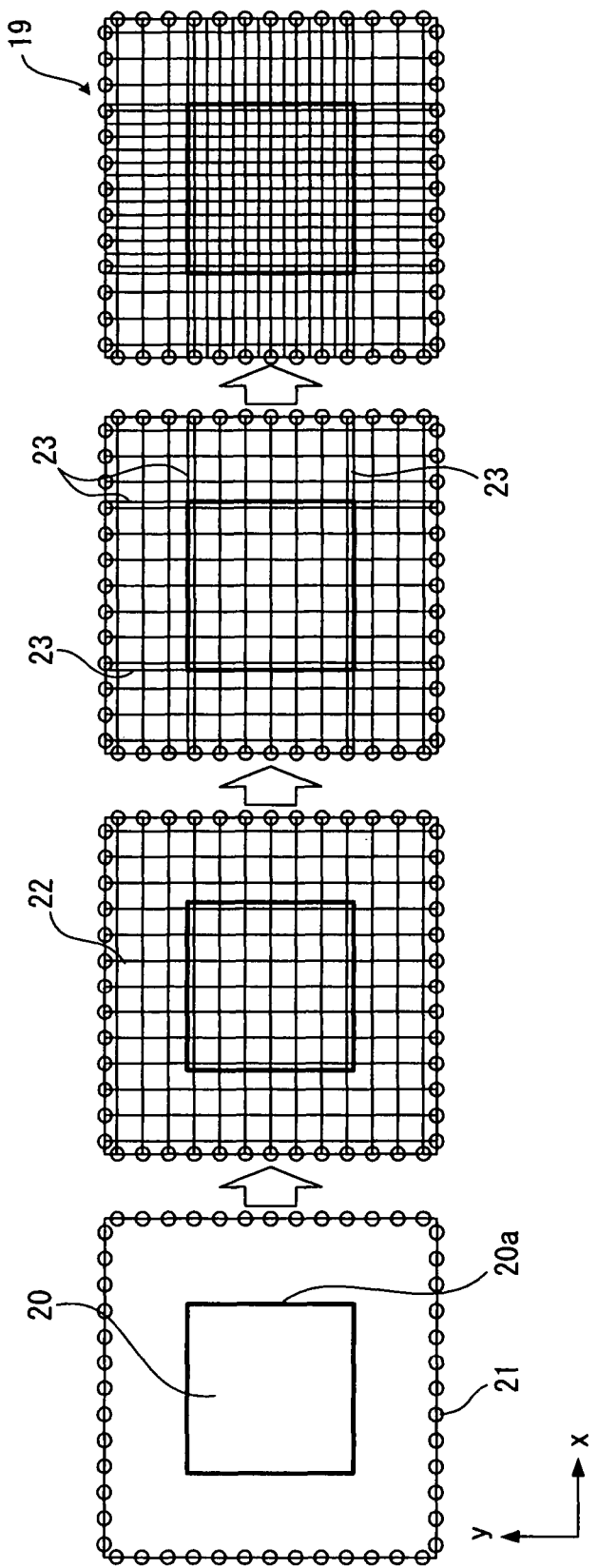

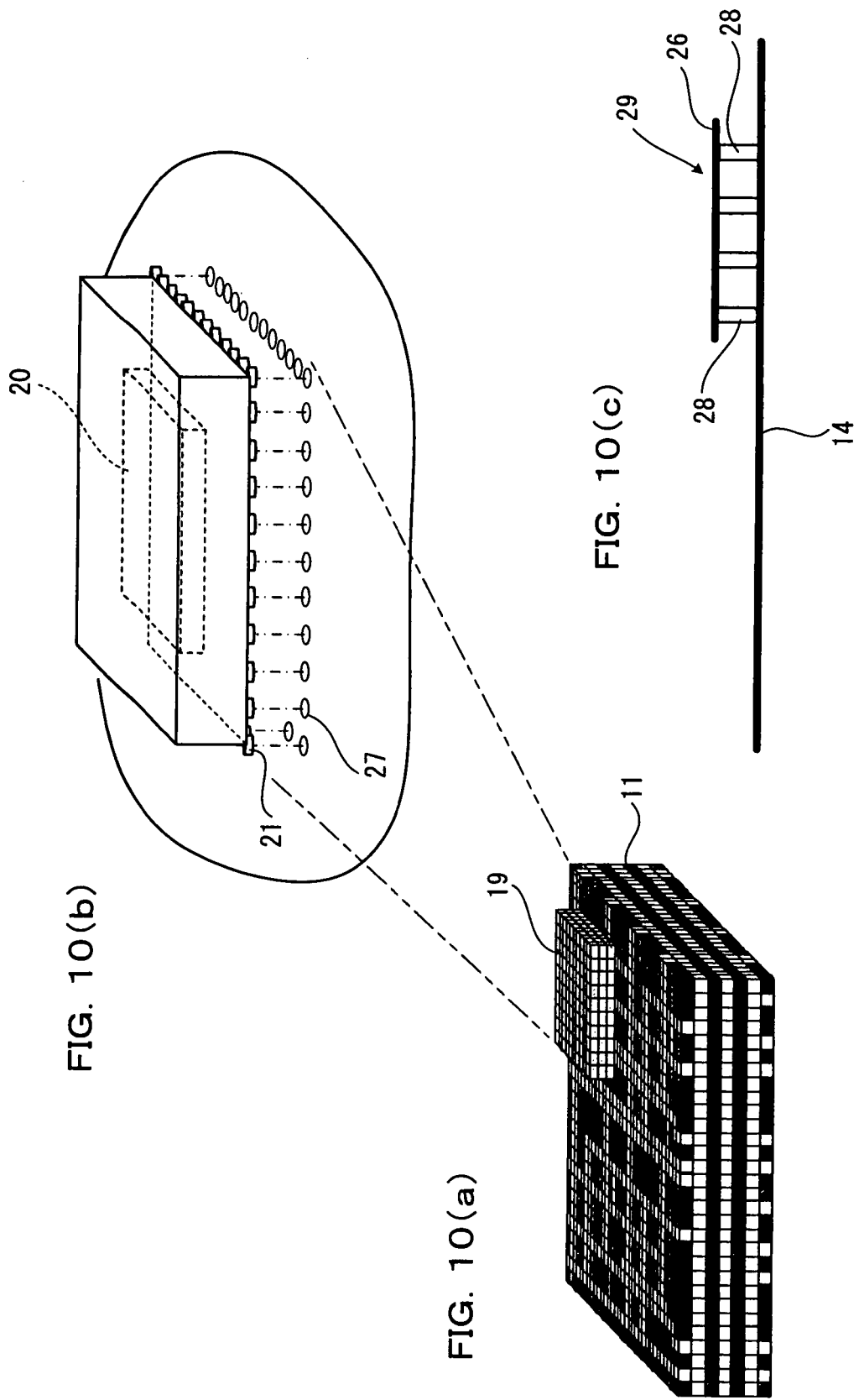

ENLARGEMENT

US 7,873,932 B2

METHOD FOR ANALYZING COMPONENT MOUNTING BOARD

The present application is based on International Application No. PCT/JP2006/300834, filed Jan. 20, 2006 which application claims priority to Japanese Patent Applications Nos. 2005-066935, filed Mar. 10, 2005, 2005-202372, filed Jul. 12, 2005 and 2005-269312, filed Sep. 16, 2005, the entire contents of which are hereby incorporated by reference.

TECHNICAL FIELD

The present invention relates to a method for analyzing physical properties of a component mounting board in a state in which components are mounted to a multilayer wiring board used to construct electric circuits of various electronic devices.

BACKGROUND ART

For the purpose of miniaturizing an electronic device, a multilayer wiring board has recently been adopted to construct an electronic circuit for high density mounting of an electronic component. In terms of a wiring pattern of each layer of the multilayer wiring board, a multilayer wiring pattern satisfying electric performance may be obtained by inputting circuit data to computer-aided design (CAD) for aiding in designing the multilayer wiring board.

However, the mechanical performance of a finished component mounting board varies with a material of each layer of a multilayer wiring board or a width of a wiring pattern, that is, a difference in the survival rate of a copper foil portion of a wiring pattern, a difference in the rigidity of an internally mounted electronic component, via hole positions, the number of via holes, a component mounted to a surface, a component mounting method, and the like. Specifically, there is possibility that the curvature beyond the limit will occur in a multilayer wiring board, and a malfunction will occur in the multilayer wiring board due to external force or temperature variation.

As is seen from the prior art (Patent Literature 1) for a multilayer wiring board, three-dimensional models of layers are created from a pattern corresponding to an external geometry of the board and thickness data. A solid model of the entire board is created by overlapping and accumulating the three-dimensional models of layers. When external force or temperature variation is applied to the solid model, it is determined whether geometric variation in the solid model is deformation in an allowable range. If the geometric variation in the solid model is deformation out of the allowable range, the multilayer wiring board satisfying the mechanical performance is designed by feeding back the deformation to a design step based on the CAD.

The idea of the above "solid model" itself is the theory established and adopted in the field of the stress analysis of various kinds of three-dimensional industrial components, and is described in detail in Non-Patent Literature 1 and the like.

Patent Literature 1: Japanese Patent Unexamined Publication No. 2004-13437

Non-Patent Literature 1: "Finite Element Method Handbook I Basic Volume", Kyuichiro Washizu and Hiroshi Miyamoto, BAIFUKAN Co., Ltd., Feb. 25, 1989, Fifth Impression of First Edition

DISCLOSURE OF THE INVENTION

Problems to be Solved by the Invention

Moreover, in order to expect highly precise analysis results, a large number of partitions are required within a plane of each layer and computation cost is required as the number of elements becomes huge. When the mechanical performance of a component mounting board in which a component is mounted to a surface of a multilayer wiring board as well as the multilayer wiring board is analyzed, the number of elements becomes huge and therefore computation cost increases.

Where an allowable range at an aspect size ratio of the external geometry of a multilayer wiring board is narrow and a thin multilayer wiring board is used, improvement in precision is not expectable.

An object of the present invention is to provide a method for analyzing a component mounting board that enables reduction in computation cost and improvement in analysis precision.

Means for Solving the Problems

As described in Claim 1 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board; generating a multilayer component shell model divided by element division lines based on a bonding position to the surface of the multilayer wiring board of the component; redividing a mounting position of the component of the multilayer substrate shell model with the element division lines used upon generating the multilayer component shell model; forming an analysis model by bonding a neutral substrate plane computed from the redivided multilayer substrate shell model and a neutral component plane computed from the multilayer component shell model with one of a beam element and a solid element serving as a bonding element equivalent to mounting conditions of the component; and computing deformation by applying boundary conditions to the analysis model. FIG. 6 is a view corresponding to Claim 1.

As described in Claim 2 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board, wiring patterns of the layers and a position of land to which the component is surface-mounted and generating a multilayer substrate shell model in which the single layer models of the layers are stacked in the geometry of the multilayer wiring board using thickness information of each of the layers of the multilayer wiring board; generating a multilayer component shell model divided by element division lines based on a bonding position to the surface of the multilayer wiring board of the component; forming an analysis model by bonding a neutral substrate plane computed from the multilayer substrate shell model and a neutral component plane computed from the multilayer component shell model with one of a beam element and a solid element serving as a bonding element equivalent to mounting conditions of the component; and computing deformation by applying boundary conditions to the analysis model. FIG. 16 is a view corresponding to Claim 2 and is different from Claim 1 in that both the component and the substrate are not redivided.

In the method for analyzing the component mounting board as described in Claim 3 according to one of Claim 1 and Claim 2, wherein forming the analysis model by bonding the neutral substrate plane and the neutral component plane with one of the beam element and the solid element serving as the bonding element includes: computing the analysis model by connecting a node of a resin bonding material area, excluding a node connected with one of the beam element and the solid element serving as the bonding element between the multilayer substrate shell model and the multilayer component shell model, with a bonding element having a mechanical strength equivalent to that of a resin bonding material of the resin bonding material area.

As described in Claim 4 of the present invention, a component data library for accumulating component data to be used to analyze physical properties of a component mounting board in which a component is mounted to a surface of a multilayer wiring board, includes: a recorded multilayer component shell model, mapped to each component, which is element-divided on the basis of an external geometry and internal structure of the component and a bonding division line passing through a bonding position of the component to the surface of the multilayer wiring board.

As described in Claim 5 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board; reading a multilayer component shell model from a component data library recording the multilayer component shell model, mapped to each component, element-divided on the basis of an external geometry and internal structure of the component and a bonding division line passing through the bonding position of the component to the surface of the multilayer wiring board; redividing a mounting position of the component of the multilayer substrate shell model with the element division lines of the multilayer component shell model; forming an analysis model by bonding a neutral substrate plane computed from the redivided multilayer substrate shell model and a neutral component plane computed from the multilayer component shell model with one of a beam element and a solid element serving as a bonding element equivalent to mounting conditions of the component; and computing deformation by applying boundary conditions to the analysis model. FIG. 17 is a view corresponding to Claim 5 and is different from Claim 1 in that the component data library as described in Claim 4 is used.

As described in Claim 6 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board, wiring patterns of the layers and a position of land to which the component is surface-mounted and generating a multilayer substrate shell model in which the single layer models of the layers are stacked in the geometry of the multilayer wiring board using thickness information of each of the layers of the multilayer wiring board; reading a multilayer component shell model from a component data library recording the multilayer component shell model, mapped to each component, element-divided on the basis of an external geometry and internal structure of the component and a bonding division line passing through the bonding position of the component to the surface of the multilayer wiring board; forming an analysis model by bonding a neutral substrate plane computed from the redivided multilayer substrate shell model and a neutral component plane computed from the multilayer component shell model with one of a beam element and a solid element serving as a bonding element equivalent to mounting conditions of the component; and computing deformation by applying boundary conditions to the analysis model. FIG. 18 is a view corresponding to Claim 6 and is different from Claim 2 in that the component data library as described in Claim 4 is used.

As described in Claim 7 of the present invention, a component data library for accumulating component data to be used to analyze physical properties of a component mounting board in which a component is mounted to a surface of a multilayer wiring board, includes: a recorded neutral component plane, mapped to the component, computed from a multilayer component shell model element-divided on the basis of an external geometry and internal structure of the component and a bonding division line passing through a bonding position of the component to the surface of the multilayer wiring board.

As described in Claim 8 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board; reading a neutral component plane from a component data library recording the neutral component plane, mapped to the component, computed from a multilayer component shell model element-divided on the basis of an external geometry and internal structure of the component and a bonding division line passing through a bonding position of the component to the surface of the multilayer wiring board; redividing a mounting position of the component of the multilayer substrate shell model with the element division lines of the multilayer component shell model; forming an analysis model by bonding a neutral substrate plane computed from the redivided multilayer substrate shell model and a neutral component plane computed from the multilayer component shell model with one of a beam element and a solid element serving as a bonding element equivalent to mounting conditions of the component; and computing deformation by applying boundary conditions to the analysis model. FIG. 19 is a view corresponding to Claim 8 and is different from Claim 1 in that the component data library as described in Claim 7 is used.

As described in Claim 9 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board, wiring patterns of the layers and a position of land to which the component is surface-mounted and generating a multilayer substrate shell model in which the single layer models of the layers are stacked in the geometry of the multilayer wiring board using thickness information of each of the layers of the multilayer wiring board; reading a neutral component plane from a component data library recording the neutral component plane, mapped to the component, computed from a multilayer component shell model element-divided on the basis of an external geometry and internal structure of the component and a bonding division line passing through a bonding position of the component to the surface of the multilayer wiring board; forming an analysis model by bonding a neutral substrate plane computed from the redivided multilayer substrate shell model and the neutral component plane with one of a beam element and a solid element serving as a bonding element equivalent to mounting conditions of the component; and computing deformation by applying boundary conditions to the analysis model. FIG. 20 is a view corresponding to Claim 9 and is different from Claim 2 in that the component data library as described in Claim 7 is used.

As described in Claim 10 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board; generating a multilayer component shell model divided by element division lines based on a bonding position to the surface of the multilayer wiring board of the component; generating an intermediate bonding file to connect an intersection of element division lines of a model of one side of the multilayer substrate shell model and the multilayer component shell model with an intersection of element division lines closest to the model of the other side on the basis of a distance from an intersection of element division lines closest to the model of the other side and rigidity therebetween when the multilayer component shell model whose element division line position is different from that of the multilayer substrate shell model is bonded in a mounting position of the component to a surface of the multilayer substrate shell model; forming an analysis model by bonding a neutral substrate plane computed from the multilayer substrate shell model and a neutral component plane computed from the multilayer component shell model with one of a beam element and a solid element serving as a bonding element equivalent to mounting conditions of the component in the intermediate bonding file; and computing deformation by applying boundary conditions to the analysis model. FIG. 21 is a view corresponding to Claim 10 and is different from Claim 2 in that, for example, redivision for the multilayer component shell model of the multilayer substrate shell model is unnecessary by employing the generated intermediate bonding file without generating the multilayer substrate shell model on the basis of the position of the land to which the component is surface-mounted.

As described in Claim 11 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board; reading a multilayer component shell model from a component data library recording the multilayer component shell model, mapped to each component, element-divided on the basis of an external geometry and internal structure of the component and a bonding division line passing through the bonding position of the component to the surface of the multilayer wiring board; generating an intermediate bonding file to connect an intersection of element division lines of a model of one side of the multilayer substrate shell model and the multilayer component shell model with an intersection of element division lines closest to the model of the other side on the basis of a distance from an intersection of element division lines closest to the model of the other side and rigidity therebetween when the multilayer component shell model whose element division line position is different from that of the multilayer substrate shell model is bonded in a mounting position of the component to a surface of the multilayer substrate shell model; forming an analysis model by bonding a neutral substrate plane computed from the multilayer substrate shell model and a neutral component plane computed from the multilayer component shell model with one of a beam element and a solid element serving as a bonding element equivalent to mounting conditions of the component in the intermediate bonding file; and computing deformation by applying boundary conditions to the analysis model. FIG. 23 is a view corresponding to Claim 11 and is different from Claim 6 in that, for example, redivision for the multilayer component shell model of the multilayer substrate shell model is unnecessary by employing the generated intermediate bonding file without generating the multilayer substrate shell model on the basis of the position of the land to which the component is surface-mounted.

As described in Claim 12 of the present invention, a method for analyzing a component mounting board, includes: when physical properties of the component mounting board in which a component is mounted to a surface of a multilayer wiring board are analyzed, generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board; reading a neutral component plane from a component data library recording the neutral component plane, mapped to the component, computed from a multilayer component shell model element-divided on the basis of an external geometry and internal structure of the component and a bonding division line passing through a bonding position of the component to the surface of the multilayer wiring board; generating an intermediate bonding file to connect an intersection of element division lines of a model of one side of the multilayer substrate shell model and the multilayer component shell model with an intersection of element division lines closest to the model of the other side on the basis of a distance from an intersection of element division lines closest to the model of the other side and rigidity therebetween when the multilayer component shell model whose element division line position is different from that of the multilayer substrate shell model is bonded in a mounting position of the component to a surface of the multilayer substrate shell model; forming an analysis model by bonding a neutral substrate plane computed from the multilayer substrate shell model and the neutral component plane computed from the multilayer component shell model with one of a beam element and a solid element serving as a bonding element equivalent to mounting conditions of the component in the intermediate bonding file; and computing deformation by applying boundary conditions to the analysis model. FIG. 24 is a view corresponding to Claim 12 and is different from Claim 9 in that, for example, redivision for the multilayer component shell model of the multilayer substrate shell model is unnecessary by employing the generated intermediate bonding file without generating the multilayer substrate shell model on the basis of the position of the land to which the component is surface-mounted.

As described in Claim 13 of the present invention, a program for analyzing a component mounting board is constructed to perform a method for analyzing the component mounting board according to any one of Claim 1, Claim 2, Claim 5, Claim 6, Claim 8, Claim 9, Claim 10, Claim 11, and Claim 12.

ADVANTAGES OF THE INVENTION

In a method for analyzing a mounting component board in accordance with the present invention, single layer models of layers are generated on the basis of an external geometry of a multilayer wiring board in which materials within the layers are uneven and constitutions of the layers, a multilayer shell model is generated on the basis of the generated single layer models, and deformation is computed by creating an analysis model in which a neutral plane of a multilayer component shell model and a neutral plane of a multilayer substrate shell model are bonded with one of a beam element and a solid element serving as a bonding element equivalent to mounting conditions of a component and applying boundary conditions to the analysis model without substituting the boundary conditions into the multilayer shell model to compute the deformation, thereby achieving better analysis results about how the multilayer wiring board is affected by the component mounted to a surface thereof and about how the component mounted to the surface of the multilayer wiring board is affected by the multilayer wiring board, in spite of a smaller computation amount than that of a conventional analysis method.

BRIEF DESCRIPTION OF THE DRAWINGS

FIG. 1 shows a flow of stress analysis of a multilayer wiring board based on a method for analyzing a plate-like body in accordance with the present invention.

FIG. 2 is an exploded view showing the multilayer wiring board in an embodiment of the present invention.

FIGS. 3(a)-3(d) are explanatory views showing a process for assigning a material type in a single layer model in the embodiment.

FIGS. 4(a)-4(b) are explanatory views showing a multilayer shell model in which single layer models are stacked in the embodiment.

FIGS. 5(a)-5(b) are explanatory views showing a neutral plane computed from the multilayer shell model in the embodiment.

FIG. 7 is an explanatory view showing layer division of a multilayer component shell model.

FIGS. 7(a)-7(b) are explanatory views showing layer division of a multilayer component shell model.

FIGS. 8(a)-8(d) are explanatory views showing element division of the multilayer component shell model.

FIGS. 10(a)-10(c) are explanatory views showing bonding between a neutral component plane and a neutral substrate plane.

PREFERRED EMBODIMENTS FOR CARRYING OUT THE INVENTION

Figure 6:
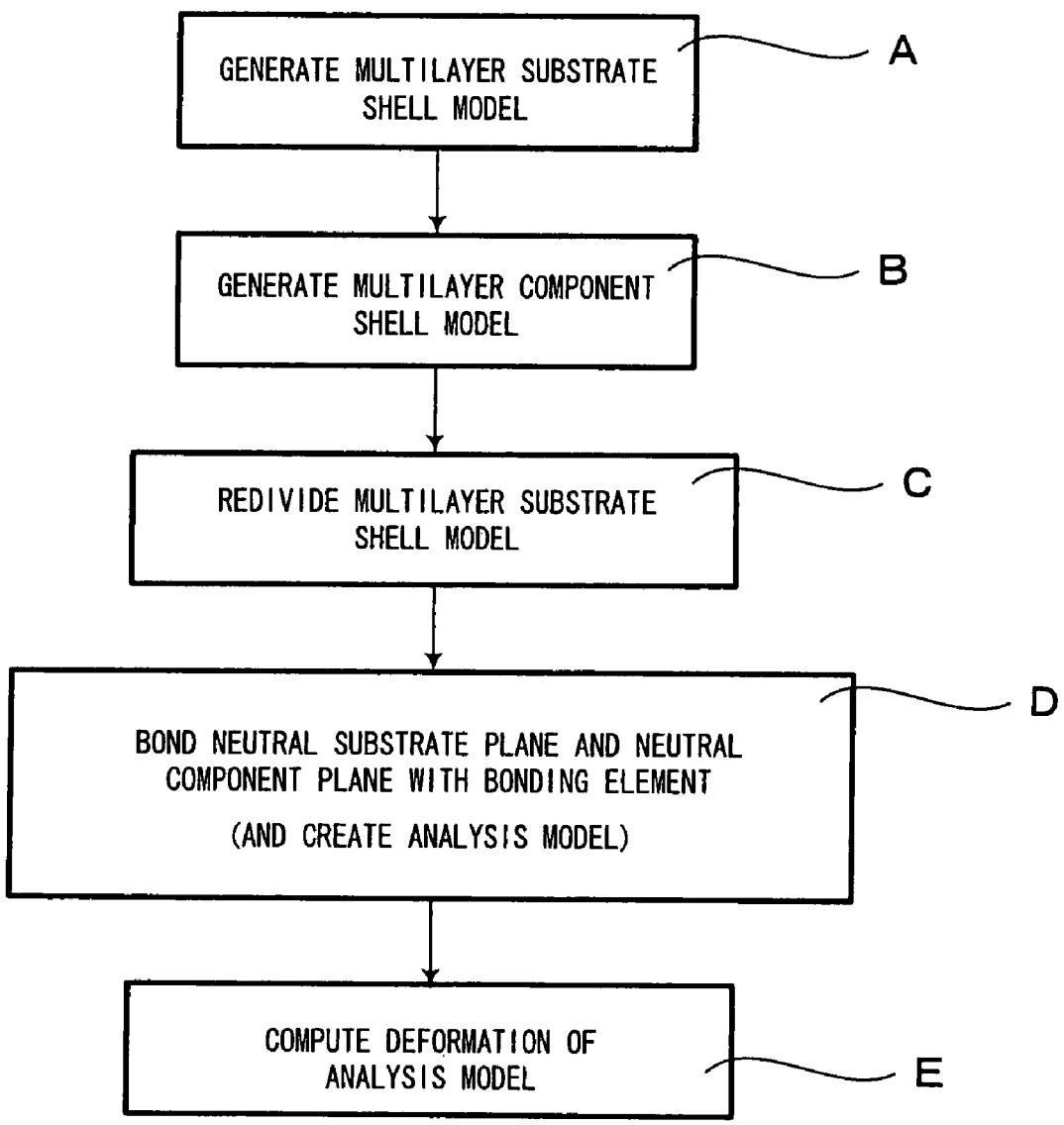
FIG. 6 is a view corresponding to Claim 1.

Hereinafter, a method for analyzing a component mounting board in accordance with the present invention will be described with reference to specific embodiments.

Embodiment 1

FIG. 1 shows a flow of stress analysis based on a method for analyzing a component mounting board.

When processing is initiated, an external geometry 1 of the multilayer wiring board to be analyzed and data 2 of a wiring pattern of each layer are prepared as a first file M1 and a component type 3, a geometry 4 and a position 5a are prepared as a second file M2 when a component is arranged inside the multilayer wiring substrate other than a wiring pattern, via hole, or the like in the multilayer wiring board. In terms of a component mounted to a surface of the multilayer wiring board, surface mounting component data 5b is prepared as the second file M2 for a mounting method, geometry and structure described for each component. In the geometry of the surface mounting component data 5b, data regarding an external geometry of a package and an arrangement of external connection terminals are included in the case of an integrated circuit. In terms of the structure, data regarding a material of a package, a position of a chip therein, and the like are recorded in the case of an integrated circuit. Data regarding a position in which a component is mounted to the surface of the multilayer wiring board can be described in accordance with the surface mounting component data 5b of each component or can be configured by reading and processing data of computer-aided design (CAD) for aiding in designing the multilayer wiring board that manages an available multilayer wiring board, a component to be mounted to the surface of the multilayer wiring board and a position in which the component is mounted to the surface of the multilayer wiring board. In this embodiment, it is described that data regarding a component mounting position and a component name are processed by reading CAD data.

Specifically, the multilayer wiring board is separated into a first layer to an n-th layer in the first file M1 as shown in FIG. 2. The first layer, the third layer, the fifth layer, . . . , the n-th layer are wiring layers. The second layer, the fourth layer, . . . , the (n−1)-th layer are insulating layers.

First, analysis in a state in which a component is not mounted to the surface of the multilayer wiring board is described in a basic state.

In step S101 of an electronic computer 6 in the basic state, an element division process is performed on the basis of the first file M1. The element division process divides each wiring layer of the first layer, the third layer, the fifth layer, . . . into a plurality of cells. A specific example of the first layer is shown in FIG. 3(a). In this drawing, a copper foil pattern 8 of the target geometry is formed on a base material 7. In this case, the element division process is performed by internally dividing a plane of the first wiring layer into cells having the same size as shown in FIG. 3(b) in step S101.

In step S102, an element determination process is performed for each cell on the basis of a preset threshold value such that a cell of copper foil 50% or more is set to have "a whole portion covered with the copper foil" and a cell of less than 50% is set to have "only a base material without copper foil" as shown in FIG. 3(c) on the basis of data of an element material type and the like relative to division data of the respective cells after the element division process in step S101. A result of assigning a material type is shown in FIG. 3(d).

Similarly, for the remaining layers of the third wiring layer, the fifth wiring layer, . . . in which the base material and the copper foil are mixed, the material type assignment process is performed in the same conditions as those for the first wiring layer. Similarly, for the case where an element material type within a plane is uniform as in the insulating layers of the second layer, the fourth layer, . . . , the (n−1)-th layer, the element determination process for each cell is performed according to the absence or presence of a via hole and the like for connecting a lower wiring layer and an upper wiring layer.

In all of the first layer to the n-th layer, a shape and size of a cell are identical and a coordinate position of an intersection GX between element division lines 24 by which the plane of each wiring layer is internally divided into cells is identical.

After division data 9 and element material type data 10 are filed in a third file M3 as the material type assignment processes are completed on a layer-by-layer basis, an analysis model is created and processed in step S103. Specifically, thickness data of the respective layers and a stacking sequence based on the first file M1 are added to two-dimensional data of the respective layers created in the process of up to step S102, such that a three-dimensional multilayer substrate shell model 11 as shown in FIG. 4(b) is created from FIG. 4(a) and the multilayer substrate shell model 11 is filed in a fourth file M4 in step S104.

When a component is arranged in a position other than a wiring pattern, a via hole, and the like inside the multilayer wiring board, the component is mounted in the associated position of the multilayer shell model created in step S103 on the basis of a component type, shape and position of the second file M2, such that multilayer shell model data 11 is created.

In the fourth file M4, boundary conditions 12 indicating the conditions aiming at analysis and physical material properties 13 of materials of the multilayer wiring board based on the first file are read in advance.

The boundary conditions 12 required at the time of using a finite element method are restraint and load conditions. The restraint conditions indicate a state in which the multilayer wiring board of an analysis object is attached and supported. The load conditions are a mechanical load mechanically applied to somewhere in the multilayer wiring board and a temperature load due to the force generated from expansion and contraction of the analysis object when a temperature varies.

The physical material properties 13 are read as characteristic values of materials constituting the multilayer wiring board of the analysis object, mainly, Young's modulus, Poisson's ratio, a coefficient of linear expansion, thermal conductivity, specific heat, density, emissivity, thermal conductivity, and the like.

In step S105, a two-dimensional model of a reference plane of a three-dimensional multilayer shell model is computed on the basis of the multilayer substrate shell model 11 of the fourth file M4 and the physical material properties 13 of the fourth file M4. Specifically, as shown in FIG. 5(a), a virtual neutral substrate plane 14 present in the three-dimensional multilayer substrate shell model 11 is computed. It is assumed that the neutral substrate plane 14 is positioned at a distance d1 from an upper surface of the multilayer substrate shell model 11 and at a distance d2 from a lower surface of the multilayer substrate shell model 11.

In step S105, deformation of the neutral substrate plane 14 is computed when the boundary conditions 12 are applied to the neutral substrate plane 14. When a deformed neutral plane is denoted by 14A in FIG. 5(b), deformation 11A of the multilayer wiring board is computed by adding the distances d1, d2 based on board thickness to a surface of one side and a surface of the other side of the deformed neutral substrate plane 14A.

In step S105, in the case of stress analysis, the stress of each of the first to n-th layers is computed using the deformation 11A, the board thickness of each layer corresponding to the thickness information, and the physical properties of Young's modulus, Poisson's ratio and a coefficient of linear expansion.

To perform thermal conduction analysis in step S105, a temperature of the multilayer substrate shell model 11 is computed by applying temperature conditions to the upper and lower surfaces of the multilayer shell and computing temperatures of the first to n-th layers using board thickness of each layer corresponding to the thickness information and physical properties of thermal conductivity, specific heat and density.

In step S106, a result of the deformation 11A of step S105 is read as curvature (displacement) 15 and stress 16 of each layer in a fifth file M5. The temperature of the multilayer substrate shell model 11 is also read in the fifth file M5.

In step S107, it is determined whether the deformation and temperature of the analysis results satisfy the conditions by reading the fifth file M5 of step S106. When the conditions are not satisfied, the analysis is repeated by changing some of parameters of CAD data 17 of a sixth file M6 in which data regarding manufacturing of an analysis object is recorded and changing the first file M1 or the second file M2 on the basis of the changed parameters. When the conditions are satisfied, the analysis results are output to computer-aided manufacturing (CAM) data 18.

Since the analysis can be performed in a computation process for computing an external geometry of the multilayer wiring board by performing conversion to a neutral plane from the three-dimensional multilayer shell model 11, applying the boundary conditions 12 to the neutral substrate plane 14, computing two-dimensional deformation and temperature, and adding the thickness information in step S105, analysis results can be obtained in a shorter computation time at the substantially same precision in comparison with analysis in which boundary conditions are applied to a conventional three-dimensional solid model and three-dimensional deformation is computed.

The above-described analysis corresponds to the basic state in which a component is not mounted to the surface of the multilayer wiring board. When a component is mounted to the surface of the multilayer wiring board, a process is performed on the basis of a drawing corresponding to Claim 1 as shown in FIG. 6.

A step (A) as shown in the drawing corresponding to Claim 1 is the same as that in which the multilayer substrate shell model 11 is created and recorded in the fourth file M4 in step S103 of the electronic computer 6. A computation process for applying the boundary conditions 12 to the neutral substrate plane 14 from the three-dimensional multilayer shell model in step S105 of the electronic computer 6 is replaced with steps (B)~(D) in the drawing corresponding to Claim 1 when a component is mounted to the surface of the multilayer wiring board. Data 5b regarding a mounting method and a bonding position to the surface of the multilayer wiring board defined by the arrangement of electrical connection terminals of each component is further read from the second file M2 according to the component to be mounted to the surface of the multilayer wiring board. The following processes are performed on the basis of the data.

Creation of a multilayer component shell model 19 of a component to be mounted to the surface of the multilayer wiring board Redivision of the multilayer substrate shell model 11

Bonding of the multilayer substrate shell model 11 and the multilayer component shell model 19

The steps will be described in detail with reference to FIGS. 7 to 11.

—Creation of the Multilayer Component Shell Model 19—

This step (B) is performed in step S103. The surface mounting component data 5b of the second file M2 is retrieved using a component name, corresponding to a component to be mounted to the surface of the multilayer wiring board, read from the CAD data. When the associated component specified by the data is a quad flat package (QFP) integrated circuit as shown in FIG. 7(a), the same portions in a structure of an in-plane direction (X-Y plane) are determined to be one layer and a layer is defined whenever a structure (material) is different in a direction (Z direction) away from the multilayer wiring board. Herein, as shown in FIG. 7(b), a layer including an embedded integrated circuit (IC) chip 20 is a second layer, its under side is a first layer, and its upper side is a third layer. As shown in FIG. 8, external connection terminals 21 serving as bonding portions to be soldered to the land of the surface of the multilayer wiring board are peripherally provided to the first layer. The first layer and the third layer are made of only a package material, whereas the second layer is made of the package material and the IC chip 20 whose mechanical properties are different from those of the package material.

First, the second layer as shown in FIG. 8(a) is mesh-divided in the in-plane direction as shown in FIG. 8(b). Herein, the mesh division is made with reference to a division line 22 passing through a position of the external connection terminal 21 of the first layer. Next, the second layer as shown in FIG. 8(c) is mesh-divided with an additional division line 23 based on a side 20a of the IC chip 20 as shown in FIG. 8(d), and a material type is assigned to each divided area. When the element material type is uniform in the plane like the first layer and the third layer, the mesh division is performed with the same division line as shown in FIG. 8(d) and the material type is assigned to each area.

The thickness data and the stacking sequence are applied to single layer models of the first to third layers of the component created as described above. The three-dimensional multilayer component shell model 19 is created as shown in FIG. 10(a) and the fourth file M4 is filed as the multilayer component shell model 19 in step S104.

—Redivision of the Multilayer Substrate Shell Model 11—

This step (C) is performed in step S103.

Figure 9A:
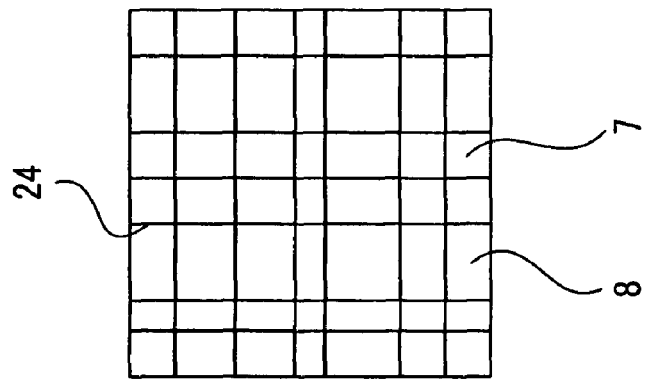
FIGS. 9(a)-9(d) are explanatory views showing redivision of a multilayer substrate shell model.

It is assumed that the multilayer substrate shell model 11 is redivided on the basis of an independent structure of the multilayer wiring board, and the multilayer substrate shell model 11 recorded in the fourth file M4 at a current point is divided into a base material 7 and a copper wiring 8 with an element division line 24 as shown in FIG. 9(a).

Figure 9B:
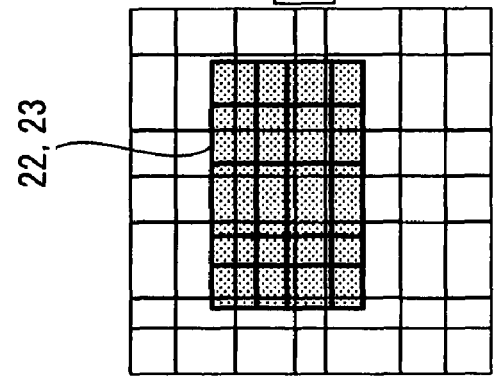
Figure 9C:
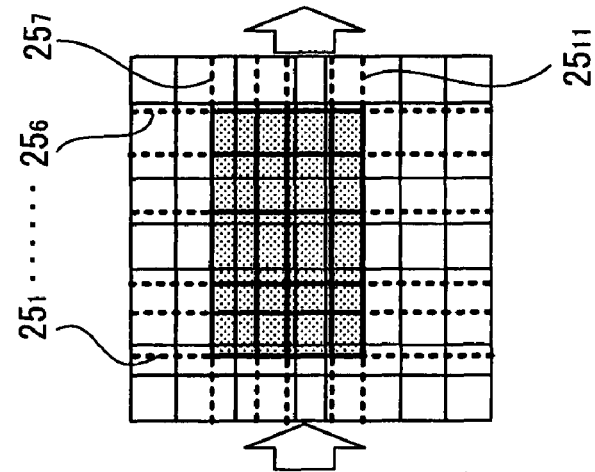
Figure 9D:
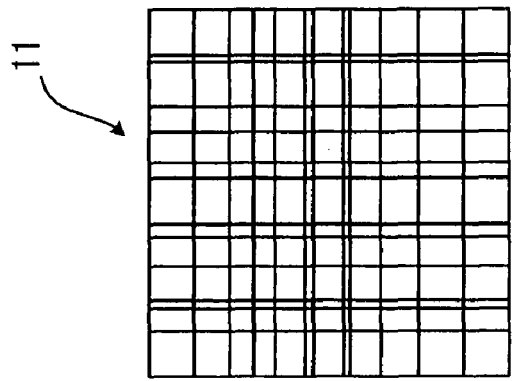

The meshes of the element division lines 22 and 23 on the part of the multilayer component shell model 19 as shown in FIG. 9(b) are superimposed in a mounting position of a component read from the CAD data. The content of the multilayer substrate shell model 11 of the fourth file M4 is updated to the content as shown in FIG. 9(d) in which all the layers of the multilayer substrate shell model 11 are sub-divided by new element division lines 251~2511 corresponding to the meshes of the element division lines 22, 23 on the part of the component as shown in FIG. 9(c).

—Bonding of the Multilayer Substrate Shell Model 11 and the Multilayer Component Shell Model 19—

This step (D) is performed in step S105.

FIG. 10(a) shows a state in which the multilayer component shell model 19 overlaps in a mounting position of the multilayer substrate shell model 11, and FIG. 10(b) is an enlarged view showing the component of the component mounting position and the multilayer wiring board. The neutral substrate plane 14 of the multilayer substrate shell model 11 (see FIG. 5(b)) and the neutral component plane 26 of the multilayer component shell model 19 (see FIG. 10(c)) are computed, respectively. When the neutral substrate plane 14 is computed, the neutral substrate plane 14 is computed by reading physical material property values of each element separated by the element division line 24 of each layer of the multilayer substrate shell model 11 from the physical material properties 13 of the fourth file M4 and substituting the read values. When the neutral component plane 26 is computed, the neutral component plane 26 is computed by reading physical material property values of each element separated by the element division lines 22, 23 of each layer of the multilayer component shell model 19 from the physical material properties 13 of the fourth file M4 and substituting the read values.

Since each external connection terminal 21 of the component as shown in FIG. 10(*b*) is soldered to land 27 of the multilayer wiring board in the case of the QFP integrated circuit in mounting a component for the multilayer wiring board, bonding as described above is integrally made by a cylinder shaped beam element 28 serving as a bonding element equivalent to a solder as shown in FIG. 10(*c*), such that an analysis model 29 is created.

Specifically, since the meshes of the element division lines of the multilayer substrate shell model 11 and the multilayer component shell model 19 completely match, the beam element 28 bonds a mesh node in the position of each external connection terminal 21 of the neutral component plane 26 and a mesh node in the position of the land 27 of the component mounting position of the neutral substrate plane 14.

The geometry of the beam element 28 is set according to a component terminal and its geometry. When a lead line rather than a terminal is drawn from the package also in the case of the same solder, a square pillar is used for the beam element 28.

Figure 11A:
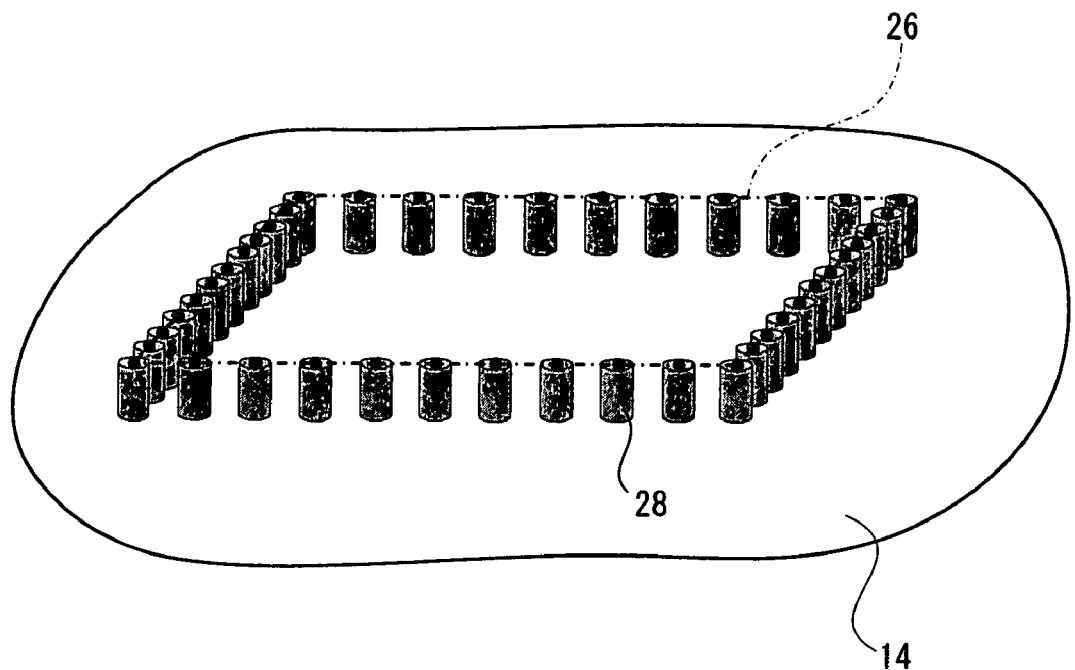
FIGS. 11(a)-11(b) are explanatory views showing bonding between the neutral component plane and the neutral substrate plane of FIG. 10 and is an explanatory view showing another embodiment in which a resin bonding material is used together.
Figure 11B:
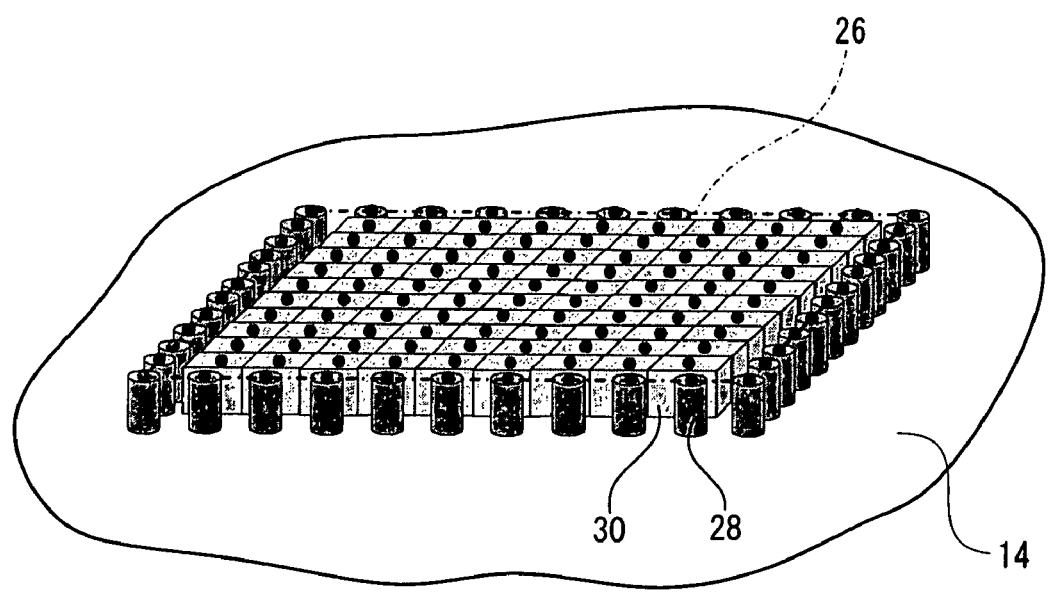

There has been described the case where any one of a non-conductive film, a non-conductive paste and an underfill resin serving as a resin bonding material is not filled between the component and the multilayer wiring board, for example, the case where the neutral component plane 26 and the neutral substrate plane 14 are connected with only the cylinder shaped beam element 28 as shown in FIG. 11(*a*). For example, when the underfill resin is filled as the resin bonding material between the multilayer wiring board and the component of a multi chip module (MCM), a ball grid array (BGA), a chip size package (CSP), or the like, the neutral component plane 26 and the neutral substrate plane 14 are not connected with only the cylinder shaped beam element 28, but a mesh node surrounded by a plurality of cylinder shaped beam elements 28 in the neutral component plane 26 and a mesh node of the neutral substrate plane 14 are additionally bonded with, for example, a beam element 30 of a square pillar serving as the bonding element equivalent to the resin bonding material as shown in FIG. 11(*b*). For each beam element 30 of the square pillar, an analysis model is created by reading physical material property values of the underfill resin from the physical material properties 13 of the fourth file M4 and substituting the read values, and a step (E) is performed.

For the analysis model of the multilayer wiring board equipped with the component created through the step (B), the step (C) and the step (D), the analysis can be additionally performed in a computation process for applying the boundary conditions 12 to the analysis model 29 to compute two-dimensional deformation and temperature and adding thickness information to compute an external geometry of the multilayer wiring board in step S105 (or the step (E) in the drawing corresponding to the claim of FIG. 6). Analysis results can be obtained in a shorter computation time at the substantially same precision in comparison with analysis in which boundary conditions are applied to a conventional three-dimensional solid model and three-dimensional deformation is computed.

Not only the multilayer wiring board in a state in which a component is surface-mounted can be analyzed, but also deformation actually applied to the component due to deformation of the multilayer wiring board can be analyzed.

Figure 25:
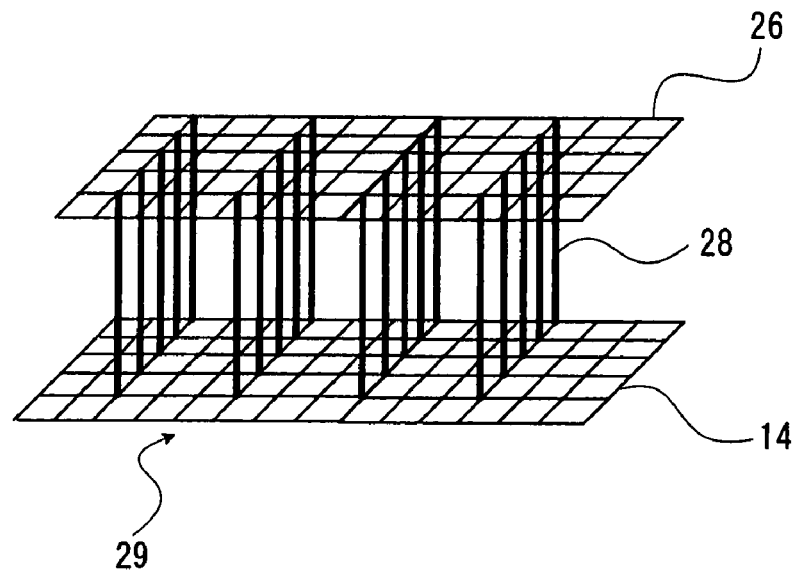
FIG. 25 is an explanatory view showing the case where a neutral substrate plane 14 and a neutral component plane 26 are bonded with a beam element.
Figure 26:
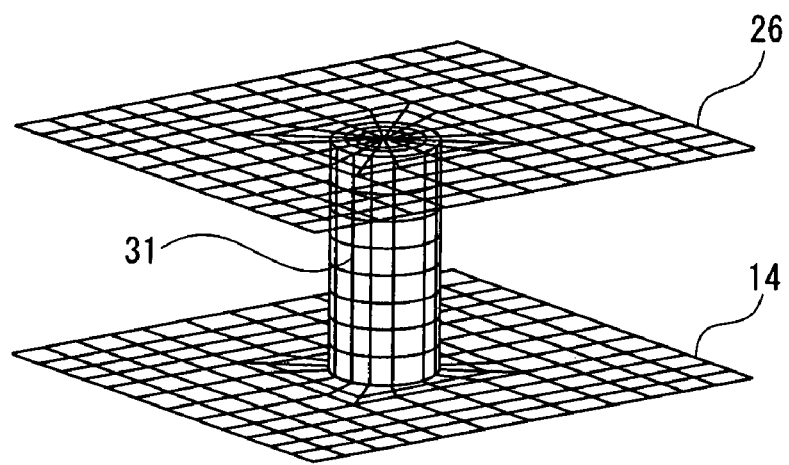
FIG. 26 is an explanatory view showing the case where the neutral substrate plane 14 and the neutral component plane 26 are bonded with a solid element.

There has been described an example of the analysis model 29 in which the neutral substrate plane 14 of the multilayer substrate shell model 11 and the neutral component plane 26 of the multilayer component shell model 19 are bonded with the beam element 28 serving as the bonding element as shown in FIG. 25. If the multilayer wiring board and the component are bonded with a bump such as a solder ball and the like, more precise analysis results can be obtained by using the analysis model 29 in which bonding is performed with a solid element 31 as shown in FIG. 26 rather than the beam element 28 serving as the bonding element.

Embodiment 2

In the element material determination process as shown in FIG. 3(*c*) in accordance with the above-mentioned embodiment, physical material property values indicating that "the whole portion is the base material 7" and "the whole portion is the copper foil pattern 8" are determined and processed according to a ratio between the base material 7 and the copper foil pattern 8 for one cell in which the base material 7 and the copper foil pattern 8 are mixed. In this embodiment (Embodiment 2), physical material property values are individually determined according to wiring width of the copper foil pattern 8 of each cell, which is different from the above-mentioned embodiment.

Figure 12:
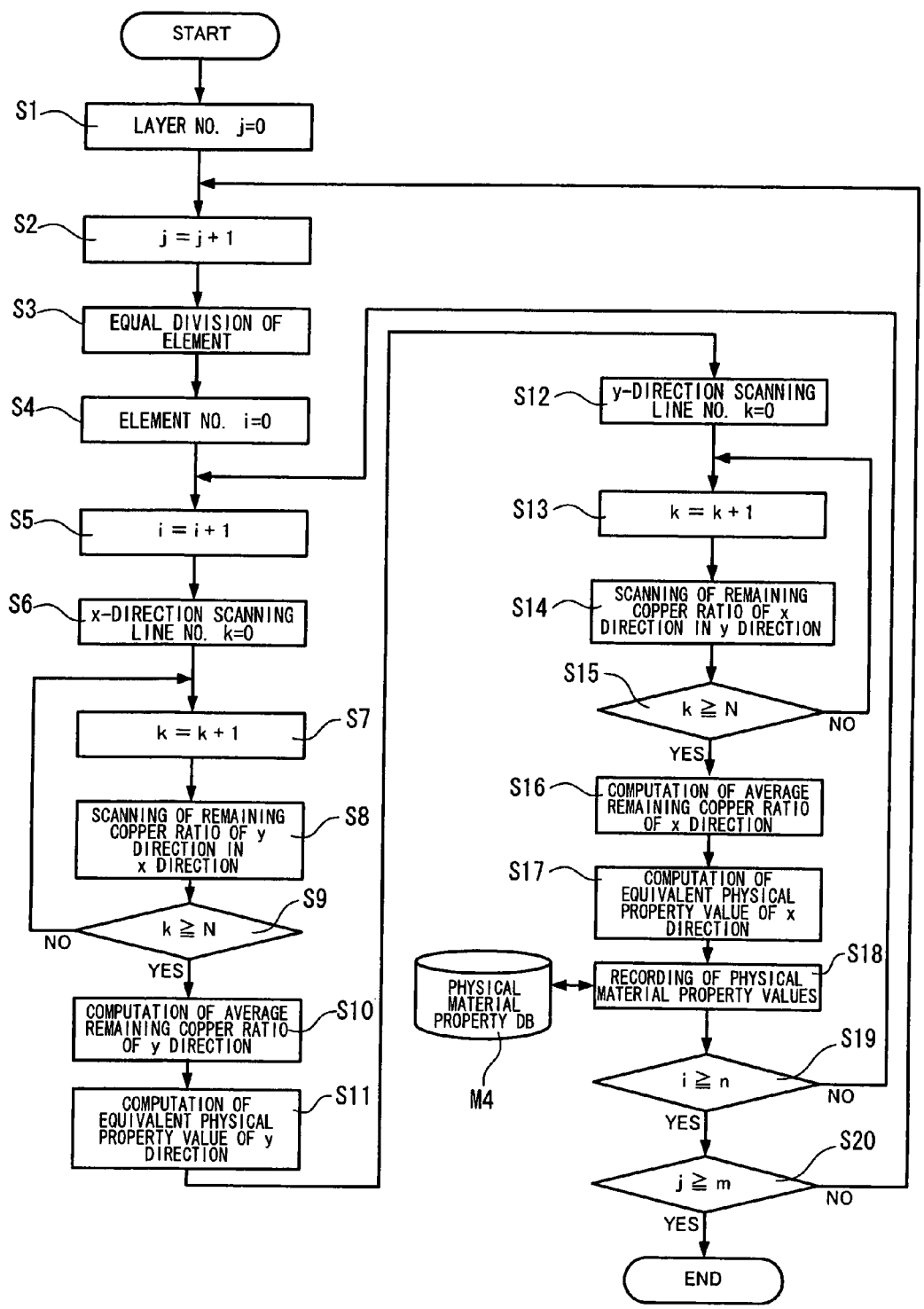
FIG. 12 is a flowchart showing another embodiment of a process for assigning a material type.
Figure 13A:
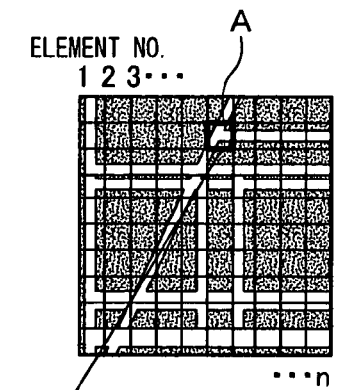
FIGS. 13(a)-13(c) are explanatory views of FIG. 12.
Figure 13B:
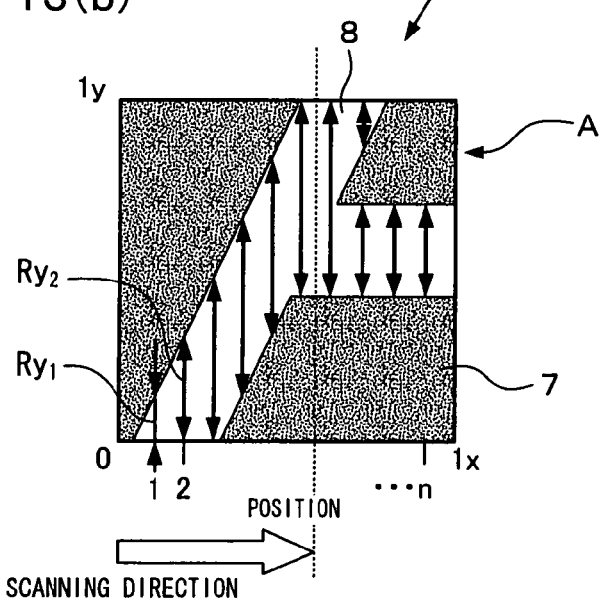

FIG. 12 and FIG. 13 show Embodiment 2.

FIG. 12 shows a processing routine in which a material of each cell A in the plane of a single layer model as shown in FIG. 13(*a*) is determined in an automatic process.

In steps S1~S11 of FIG. 12, each cell A is scanned in an x-axis direction as shown in FIG. 13(*b*) and the remaining copper ratio is computed in a y-axis direction of the copper foil pattern 8. In steps S12~S17, each cell A is scanned in the y-axis direction as shown in FIG. 13(*c*) and the remaining copper ratio is computed in the x-axis direction of the copper foil pattern 8.

In detail, in step S1, a default value j=0 is set to determine which layer of the first layer to the n-th layer starts to be applied to a computation process in a single layer model.

In step S2, the default value j=0 of step S1 is incremented and a computation process for the first layer is declared.

In step S3, a wiring pattern of the first layer designated by j=1 incremented in step S2 among data 2 of wiring patterns of the respective layers is equally divided into cells A as shown in FIG. 13(*a*).

In step S4, a default value i=0 is set for a cell A for which a computation process is initiated.

In step S5, the default value i=0 of step S4 is incremented and a computation process for a cell A of Element No. 1 is declared.

In step S6, a default value k=0 is set to declare a scanning position in the x-axis direction in the cell declared in step S5.

In step S7, the default value k=0 of step S6 is incremented and a process for computing a wiring width in each position in the x-axis direction in the cell A of Element No. 1 is declared.

In step S8, a length Ry1 is computed in the y-axis direction of the copper foil pattern 8 in which the position in the x-axis direction of the cell A of Element No. 1 is k=1.

In step S9, it is checked whether the computation process has been performed for all positions in the x-axis direction of the cell A of Element No. 1. Since k=1 here, the routine of step S7 and step S8 is repeated by returning to step S7. When the computation process has been completed for all the positions in the x-axis direction of the cell A of Element No. 1, step S10 is performed by exiting the routine at step S9.

Since the remaining copper ratio in the y-axis direction corresponds to an average value of lengths Ry1~RyN when the length of the side of the cell A is set to 1, this is set to an average remaining copper ratio. In step S10, an average value Vfy of the lengths in respective positions in the y-axis direction of the copper foil pattern 8 computed in step S8 by then is computed.

$$Vfy=(Ry1+Ry2+\ldots+RyN)/N$$

In step S11, an equivalent physical property value Ey is computed in the y-axis direction.

$$Ey=EB(1-Vfy)+ECU \cdot Vfy$$

EB is a physical property value of the base material 7 and ECU is a physical property value of the copper foil pattern 8.

In step S12, the default value k=0 is set to declare a scanning position in the y-axis direction.

In step S13, the default value k=0 of step S12 is incremented and a process for computing a wiring width in each position in the y-axis direction of the cell A of Element No. 1 is declared.

Figure 13C:
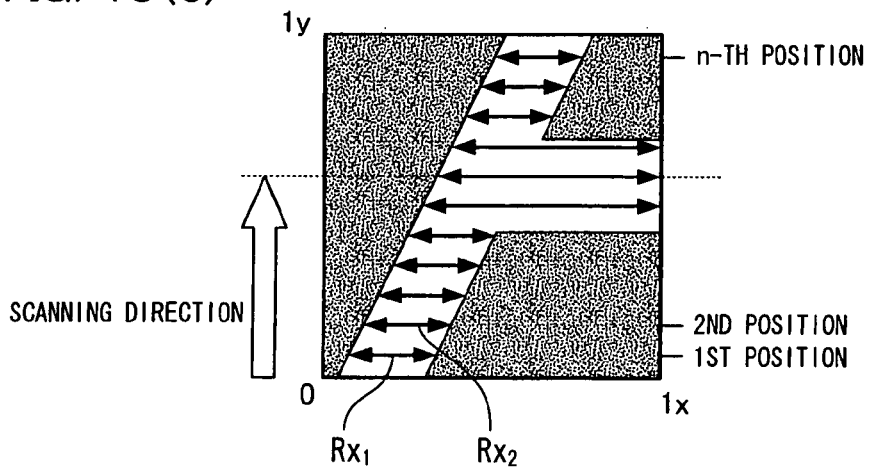

In step S14, a length Rx1 is computed in the x-axis direction of the copper foil pattern 8 in which the position in the y-axis direction of the cell A of Element No. 1 is k=1 as shown in FIG. 13(c).

In step S15, it is checked whether the computation process has been performed for all positions in the y-axis direction of the cell A of Element No. 1. Since k=1 here, the routine of step S13 and step S14 is repeated by returning to step S13. When the computation process has been completed for all the positions in the y-axis direction of the cell A of Element No. 1, step S16 is performed by exiting the routine at step S15.

In step S16, an average value Vfx of the lengths in respective positions in the x-axis direction of the copper foil pattern 8 computed in step S14 by then is computed.

$$Vfx=(Rx1+Rx2+\ldots+RxN)/N$$

In step S17, an equivalent physical property value Ex is computed in the x-axis direction.

$$Ex=EB(1-Vfx)+ECU \cdot Vfx$$

In step S18, a physical material property value based on the wiring width mapped to the cell A of Element No. 1 of the first layer declared in steps S2 and S5 is recorded in the fourth file M4 as shown in FIG. 1.

In step S19, it is checked whether step S18 has been performed for all cells A of the first layer declared in step S5. Since i=1 here, an increment to i=2 is made by returning to step S5, the routine up to step S18 for the cell A of Element No. 2 of the first layer is repeated. When the computation process has been completed for the cell A of Element No. 2, step S20 is performed by exiting the routine at step S17.

In step S20, it is checked whether step S18 has been performed for all stacked layers 1~m. Since j=1 here, an increment to j=2 is made by returning to step S2, the routine up to step S18 for the second layer to the m-th layer is repeated. When the computation process has been completed for the m-th layer, a process for collecting physical material properties based on wiring widths is completed by exiting the routine at step S20.

Since the physical material properties are determined according to the wiring widths of the respective cells, more precise analysis can be realized by computing the deformation of the neutral substrate plane 14 on the basis of the physical material properties 13 and adding the board thickness to the surface of one side and the surface of the other side of the neutral substrate plane 14 to compute an external geometry of the multilayer wiring board.

Embodiment 3

There have been described the embodiments in which a shape and size of a cell of element division are identical in planes of all single layer models. Alternatively, a model scale can be reduced by setting a shape and size of a cell of element division different from other ranges in the plane of a single layer model in which in-plane deformation does not occur or is in a small range.

That is, an area where the base material 7 and the copper foil pattern 8 are mixed is divided in a smaller size of the cell A as compared with an area occupied by only a material of either the base material 7 or the copper foil pattern 8.

Specifically, assuming that the remaining copper ratio is read from the data 2 of wiring patterns of the respective layers of the first file M1 with respect to cells roughly divided in advance and the remaining copper ratio of less than or equal to 20% is occupied by the base material 7, the roughly divided cells are not more finely divided. Since it is determined that the remaining copper ratio of at least 80% can be occupied by the copper foil pattern 8, the roughly divided cells are not more finely divided. When the remaining copper ratio is at least 20% and less than 80%, it is determined that the base material 7 and the copper foil pattern 8 are mixed and the roughly divided cells are internally finely redivided.

Figure 14A:
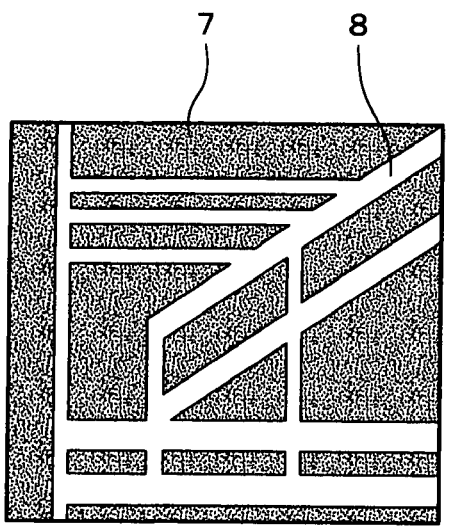
FIGS. 14(a)-14(b) are explanatory views showing a single layer model before cell division and a single layer model whose cell sizes are different after redivision.
Figure 14B:
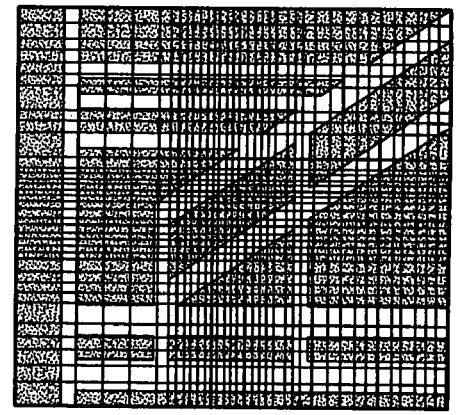

The process is repeated for the fine cells after redivision and the process for more finely redividing internal portions of the cells after redivision at the remaining copper ratio of at least 20% and less than 80% is repeated. FIG. 14(a) shows a single layer model before division, and FIG. 14(b) shows a single layer model after redivision, wherein a size of a mesh eye indicates a difference in a cell size.

Figure 15:
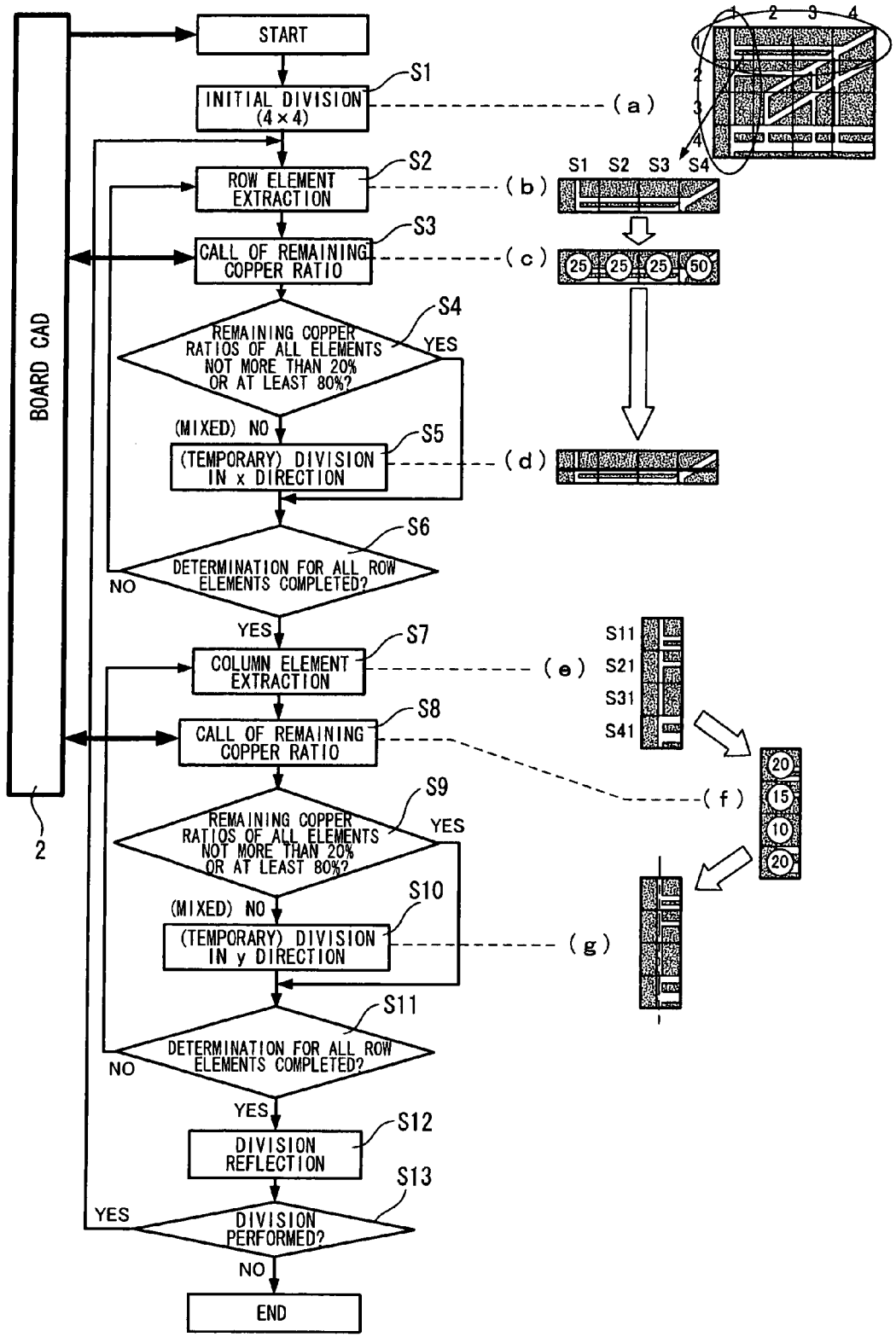
FIG. 15 is a flowchart showing a process of FIG. 14.

The process of this case is shown in the flowchart of FIG. 15.

In step S1, the single layer model is divided into a minimum number of partitions at an equal interval. Herein, initial division is set to 4×4 as indicated by (a).

In step S2, four cells S11, S12, S13 and S14 in the x-axis direction are selected together as row elements as indicated by (b).

In step S3, remaining copper ratios as indicated by (c) can be computed from wiring patterns of board CAD, specifically, wiring pattern data 2 of the respective layers of the first file M1, for all the cells S11 to S14 extracted in step S2. In this example, all the remaining copper ratios of the cells S11~S13 are 25% and the remaining copper ratio of the cell S14 is 50%.

In step S4, it is checked whether the remaining copper ratios of all elements computed in step S3 are not more than 20% or at least 80%. In this example, if the determination is "NO" in step S4, step S5 is performed. Redivision into two elements is performed in the axis direction as indicated by (d) in step S5 and step S6 is performed. Otherwise, if the determination is "YES" in step S4, step S5 is skipped and step S6 is performed.

In step S6, it is checked whether the routine between step S2 and step S6 has been performed for all the row elements of the single layer model as indicated by (a). When the required redivision is completed by performing the routine between step S2 and step S6 for all single layer models, step S7 is subsequently performed.

In step S7, four cells S11, S21, S31 and S41 in the y-axis direction are selected together as column elements as indicated by (e).

In step S8, remaining copper ratios as indicated by (f) can be computed from the wiring pattern data 2 of the respective layers of the first file M1, for all the cells S81 to S41 extracted in step S7. In this example, all the remaining copper ratios of the cells S81, S21, S31 and S41 are 20%, 15%, 10% and 20%.

In step S9, it is checked whether the remaining copper ratios of all elements computed in step S8 are not more than 20% or not less than 80%. In this example, if the determination is "YES" in step S9, step S10 is skipped and step S11 is performed. If the remaining copper ratios of all the elements computed in step S8 are not less than 20% or not more than 80%, the determination is "NO" in step S9 and the step S10 is performed. When the step S10 is performed, redivision is performed in the y-axis direction as indicated by a virtual line of (g).

In step S11, it is checked whether the routine between step S2 and step S6 has been performed for all the column elements of the single layer model as indicated by (a). When the required redivision is completed by performing the routine between step S7 and step S11 for all the single layer models, step S12 is subsequently performed.

In step S12, element numbers are assigned to the cells redivided in the above flow and the elements are handled as the cells.

In step S13, it is checked whether at least one of step S5 and step S10 has been performed. If any one of the steps is performed, the process is repeated by returning to step S2.

The multilayer substrate shell model 11 is created by performing the process of FIG. 15 for the single layer models of the respective layers.

A fine mesh division process is performed for a region in which the wiring pattern arrangement is complex and the curvature (displacement) is to be precisely computed and a rough mesh division process is performed for other regions. In other words, precise analysis results can be obtained in a short computation time according to the appropriate number of cells based on the wiring pattern arrangement by setting a shape and size of a cell of element division different from other ranges in the plane of a single layer model in which in-plane deformation does not occur or is in a small range.

In constraint conditions of mesh division in FIG. 15, all division geometries in a layer direction are to be identical and are to be divided in an orthogonal system. Thus, when the multilayer shell model of the multilayer wiring board is created, single layer models are stacked. In this case, for elements in which division geometries in the layer direction are different, all layers are redivided in a minimum cell size. Alternatively, the division in step S12 is reflected in all the layers by setting in advance the row elements selected in the x-axis direction in steps S2 and S7 of FIG. 15 to cells S11 to S14 and S11 to S41 of all the layers as well as cells S11 to S14 of a single layer and setting all the elements to targets for checking the remaining copper ratios in the subsequent steps S4 and S8.

There has been described an example of a plate-like body whose surface is flat in the embodiments as described above. A plate with curvature can be equally applied.

Figure 16:
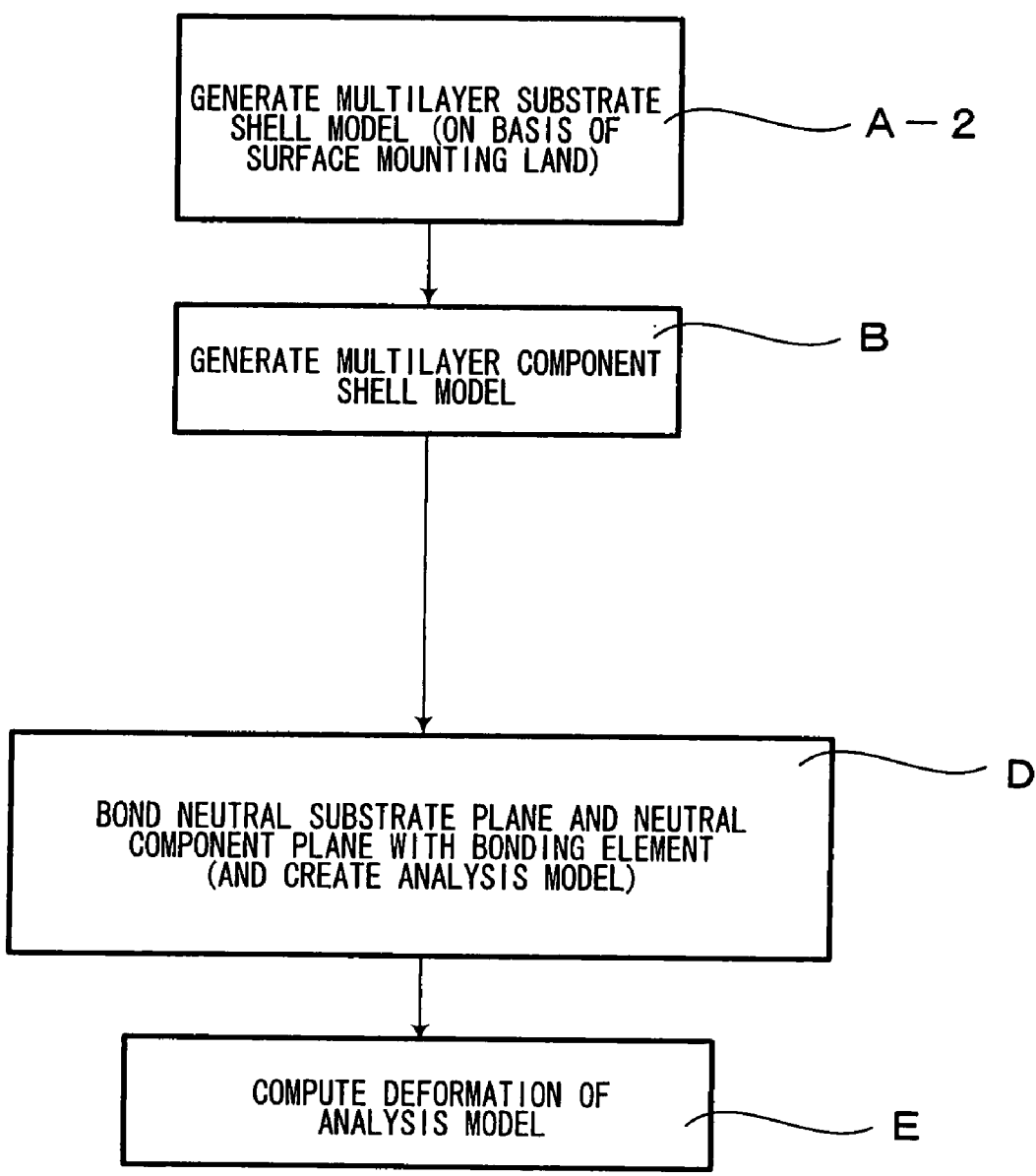
FIG. 16 is a view corresponding to Claim 2.

In the method for analyzing a component mounting board in the embodiments as described above, the multilayer substrate shell model is redivided with the mesh of element division lines of the multilayer component shell model in the step (C) as shown in FIG. 6. Alternatively, the step (C) for redividing the multilayer substrate shell model can be removed with a configuration as shown in FIG. 16.

Specifically, there are provided a step (A-2) for generating single layer models of layers internally divided by element division lines on the basis of an external geometry of the multilayer wiring board, wiring patterns of the layers and a position of land 27 to which a component is surface-mounted (wherein the land position is equal to that of a bonding division line passing through a bonding position of the component to the surface of the multilayer wiring board) and generating a multilayer substrate shell model in which the single layer models of the layers are stacked in the geometry of the multilayer wiring board using thickness information of each of the layers of the multilayer wiring board, a step (B) for generating a multilayer component shell model divided by element division lines based on the bonding position of the component to the surface of the multilayer wiring board of the component, a step (D) for forming an analysis model 29 by bonding a neutral substrate plane computed from the multilayer substrate shell model and a neutral component plane computed from the multilayer component shell model with a bonding element equivalent to mounting conditions of the component, and a step (E) for computing deformation by applying boundary conditions to the analysis model 29. The step (B) can be arranged before the step (A-2).

In the method for analyzing the component mounting board in the embodiments as described above, the multilayer component shell model is created by reading component data from the second file M2 at every time of mounting in the multilayer wiring board and the created model is recorded in the fourth file M4. However, this embodiment can further reduce the workload of the electronic computer 6 by preparing a recorded component data library mapped to each component for the multilayer component shell model element-divided on the basis of an external geometry and internal structure of the component and the bonding division line passing through the bonding position of the component to the surface of the multilayer wiring board as component data of the second file M2.

Figure 17:
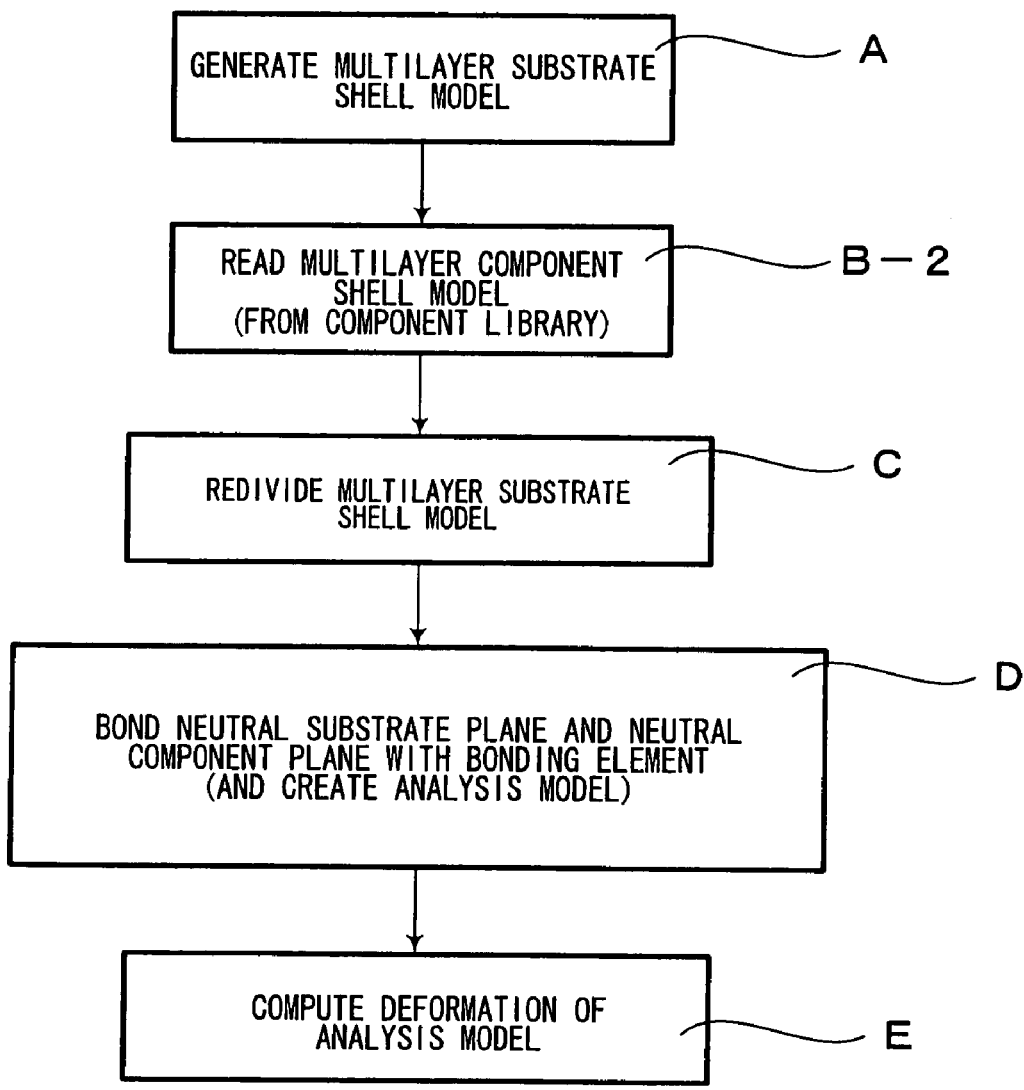
FIG. 17 is a view corresponding to Claim 5.
Figure 18:
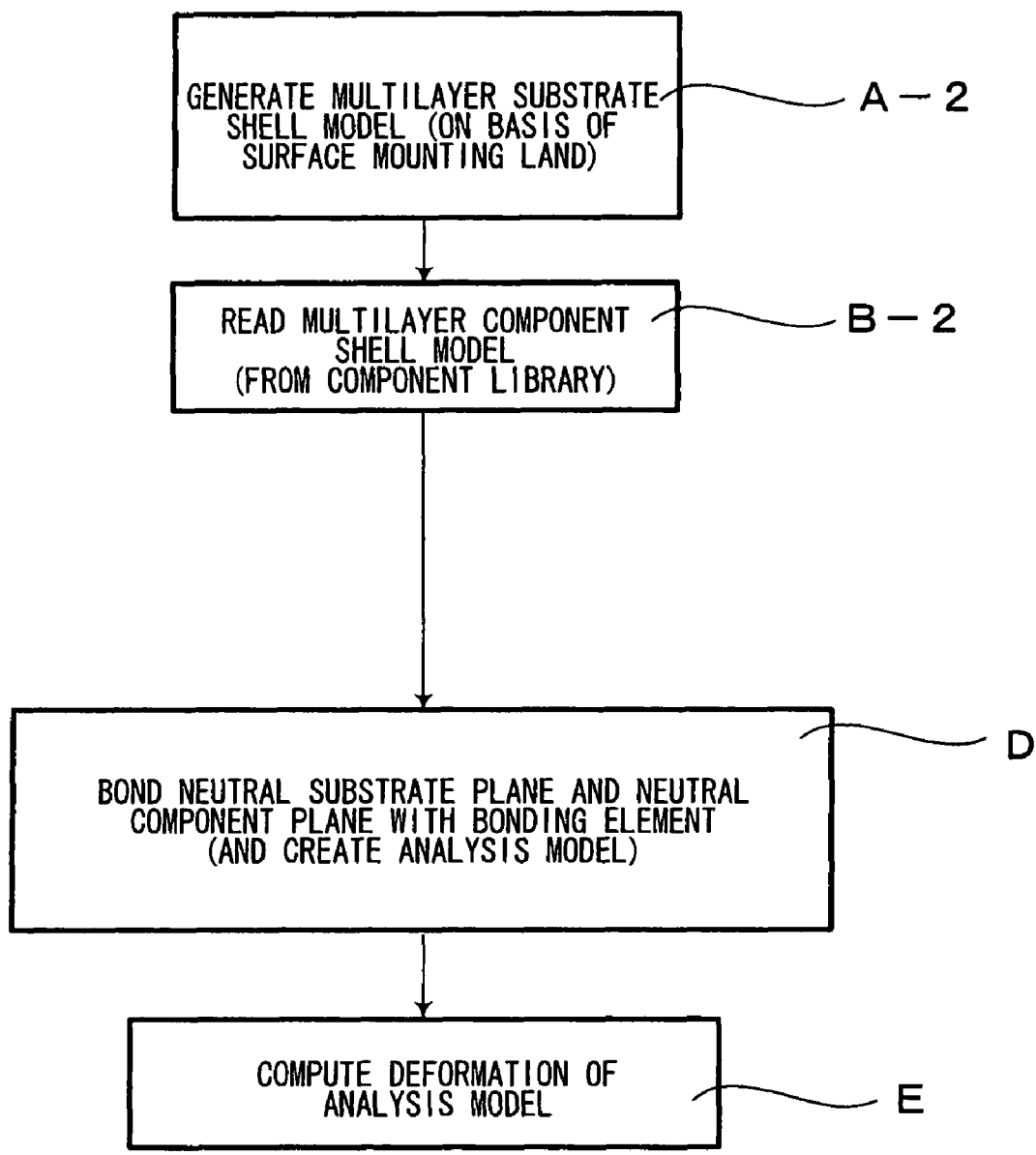
FIG. 18 is a view corresponding to Claim 6.

Specifically, a process as shown in FIG. 17 or FIG. 18 is performed.

A method for analyzing a component mounting board as shown in FIG. 17 is a modification example of FIG. 6. In this case, there are provided a step (A) for generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board, a step (B-2) for reading a multilayer component shell model from a component data library recording the multilayer component shell model, mapped to each component, element-divided on the basis of an external geometry and internal structure of the component and a bonding division line passing through the bonding position of the component to the surface of the multilayer wiring board, a step (C) for redividing a mounting position of the component of the multilayer substrate shell model with element division lines of the multilayer component shell model, a step (D) for forming an analysis model by bonding a neutral substrate plane computed from the multilayer substrate shell model and a neutral component plane computed from the multilayer component shell model with a bonding element equivalent to mounting conditions of the component, and a step (E) for computing deformation by applying boundary conditions to the analysis model.

A method for analyzing a component mounting board as shown in FIG. 18 is a modification example of FIG. 16. In this case, there are provided a step (A-2) for generating single layer models of layers internally divided by element division lines on the basis of an external geometry of the multilayer wiring board, wiring patterns of the layers and a position of land to which a component is surface-mounted (=a bonding division line passing through a bonding position of the component to the surface of the multilayer wiring board) and generating a multilayer substrate shell model in which the single layer models of the layers are stacked in the geometry of the multilayer wiring board using thickness information of each of the layers of the multilayer wiring board, a step (B-2) for reading a multilayer component shell model from a component data library recording the multilayer component shell model, mapped to each component, element-divided on the basis of an external geometry and internal structure of the component and a bonding division line passing through the bonding position of the component to the surface of the multilayer wiring board, a step (D) for forming an analysis model by bonding a neutral substrate plane computed from the multilayer substrate shell model and a neutral component plane computed from the multilayer component shell model with a bonding element equivalent to mounting conditions of the component, and a step (E) for computing deformation by applying boundary conditions to the analysis model.

In the method for analyzing the component mounting board in the embodiments as described above, the neutral component plane 26 is computed at every time of mounting in the multilayer wiring board. However, this embodiment can further reduce the workload of the electronic computer 6 by preparing a component data library recorded by mapping the neutral component plane 26 to each component as component data of the second file M2.

Figure 19:
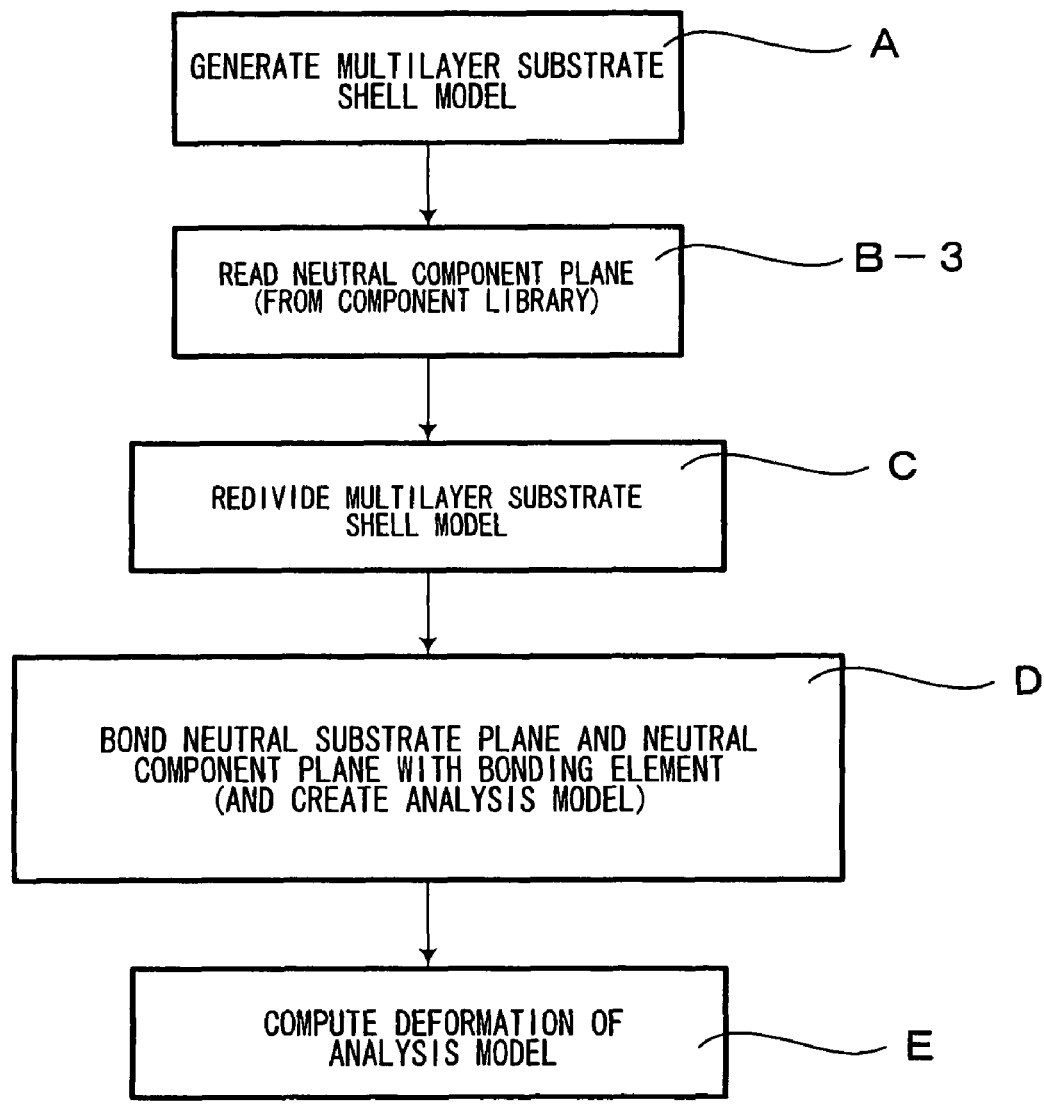
FIG. 19 is a view corresponding to Claim 8.
Figure 20:
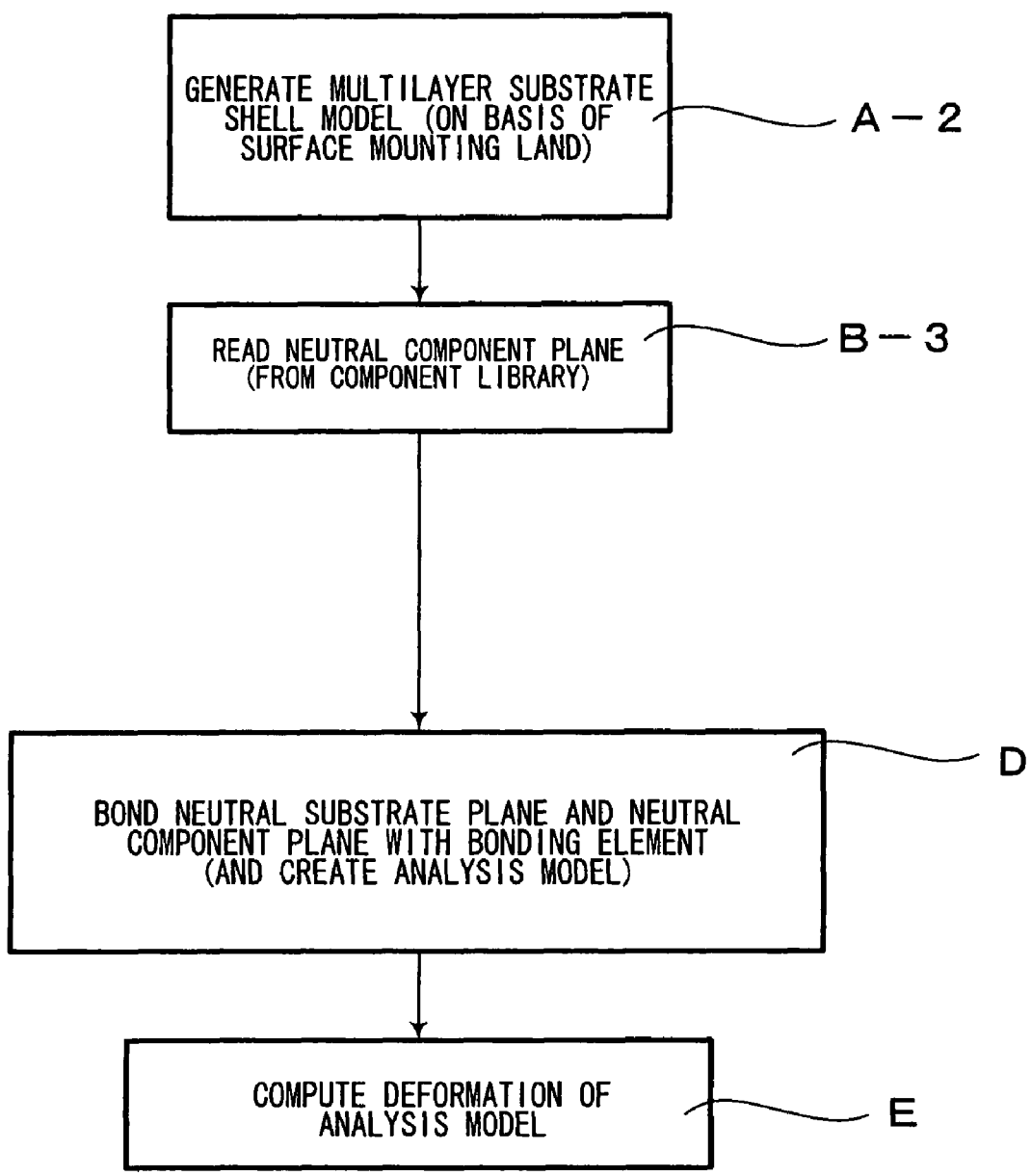
FIG. 20 is a view corresponding to Claim 9.

Specifically, a process as shown in FIG. 19 or FIG. 20 is performed.

A method for analyzing a component mounting board as shown in FIG. 19 is a modification example of FIG. 6. In this case, there are provided a step (A) for generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board, a step (B-3) for reading a neutral component plane from a component data library recording the neutral component plane, mapped to the component, computed from a multilayer component shell model element-divided on the basis of an external geometry and internal structure of the component and a bonding division line passing through a bonding position of the component to the surface of the multilayer wiring board, a step (C) for redividing a mounting position of the component of the multilayer substrate shell model with element division lines of the multilayer component shell model, a step (D) for forming an analysis model by bonding a neutral substrate plane computed from the redivided multilayer substrate shell model and the neutral component plane with a bonding element equivalent to mounting conditions of the component, and a step (E) for computing deformation by applying boundary conditions to the analysis model. The step (B-2) can be arranged before the step (A-2).

A method for analyzing a component mounting board as shown in FIG. 20 is a modification example of FIG. 16. In this case, there are provided a step (A-2) for generating single layer models of layers internally divided by element division lines on the basis of an external geometry of the multilayer wiring board, a wiring pattern of each layer and a position of land to which a component is surface-mounted (or a bonding division line passing through a bonding position of the component to the surface of the multilayer wiring board) and generating a multilayer substrate shell model in which the single layer models of the layers are stacked in the geometry of the multilayer wiring board using thickness information of each of the layers of the multilayer wiring board, a step (B-3) for reading a neutral component plane from a component data library recording the neutral component plane, mapped to the component, computed from a multilayer component shell model element-divided on the basis of an external geometry and internal structure of the component and a bonding division line passing through a bonding position of the component to the surface of the multilayer wiring board, a step (D) for forming an analysis model by bonding a neutral substrate plane computed from the multilayer substrate shell model and the neutral component plane with a bonding element equivalent to mounting conditions of the component, and a step (E) for computing deformation by applying boundary conditions to the analysis model. The step (B-3) can be arranged before the step (A-2).

When the analysis model 29 is provided in which the neutral substrate plane 14 of the multilayer substrate shell model 11 and the neutral component plane 26 of the multilayer component shell model 19 are bonded with the beam element serving as the bonding element as shown in FIG. 25, or the multilayer wiring board and the component are bonded with a bump such as a solder ball and the like, the step (D) as shown in FIG. 16, FIG. 17, FIG. 18, FIG. 19, and FIG. 20 can use the analysis model 29 bonded with the solid element 31 as shown in FIG. 26 rather than the beam element 28 for the bonding element.

To remove a process for redividing the multilayer substrate shell model in FIG. 16, FIG. 18 and FIG. 20 as described above, single layer models of layers internally divided by element division lines are generated on the basis of a position of land to which a component is surface-mounted (or a bonding division line passing through a bonding position of the component to the surface of the multilayer wiring board). Alternatively, the process for redividing the multilayer substrate shell model can be removed by a configuration as shown in FIG. 21 and FIG. 22.

Figure 21:
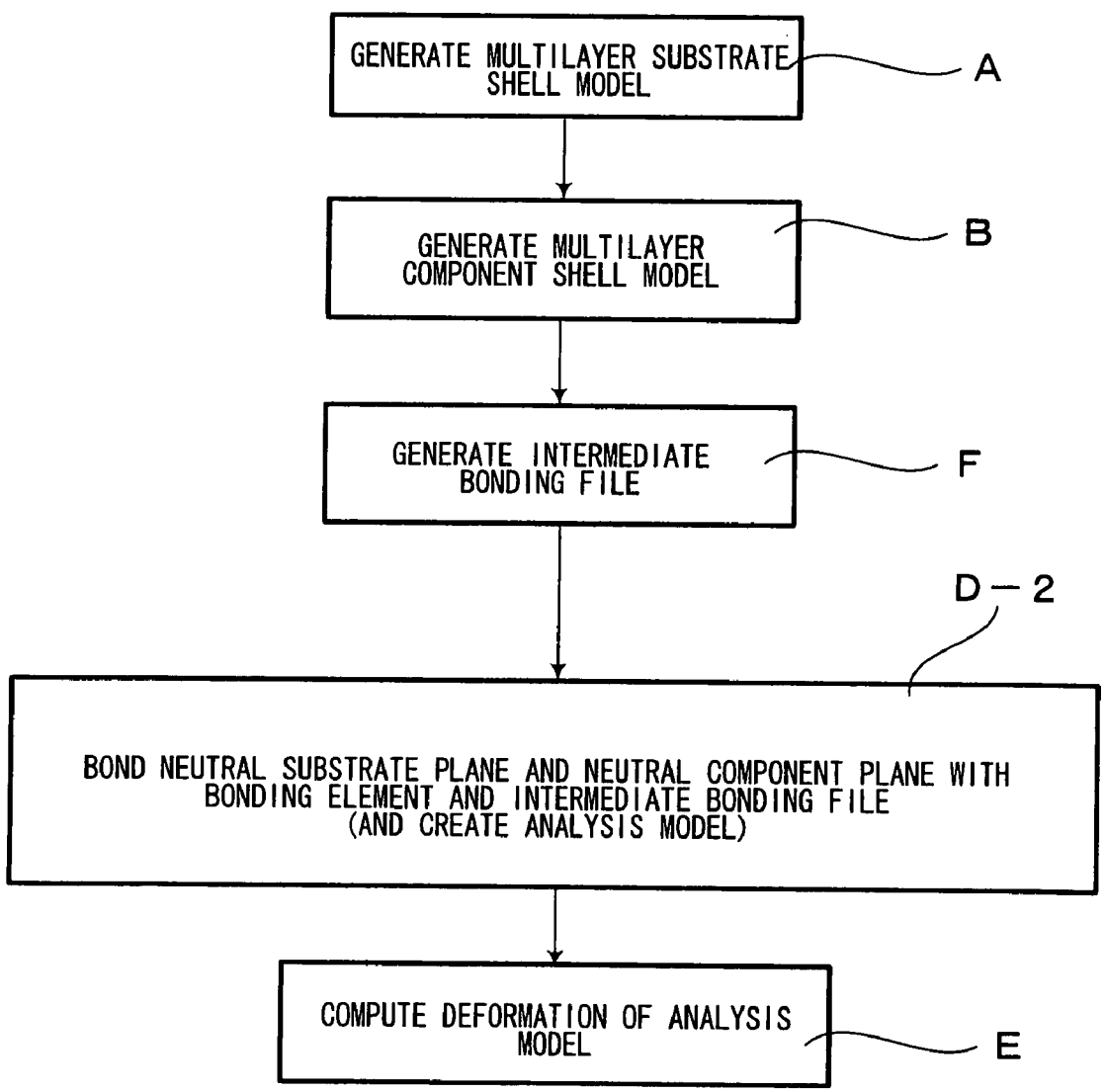
FIG. 21 is a view corresponding to Claim 10.

As shown in FIG. 21, there are provided a step (A) for generating single layer models of layers internally divided by element division lines on the basis of an external geometry of the multilayer wiring board and wiring patterns of the layers and generating a multilayer substrate shell model in which the single layer models of the layers are stacked in the geometry of the multilayer wiring board using thickness information of each of the layers of the multilayer wiring board, a step (B) for generating a multilayer component shell model divided by element division lines based on a bonding position of the component to a surface of the multilayer wiring board of the component, a step (F) for generating an intermediate bonding file to connect an intersection of element division lines of a model of one side (for example, a component) for the multilayer substrate shell model and the multilayer component shell model with an intersection of element division lines closest to the model of the other side (for example, a substrate) on the basis of a distance from the intersection of element division lines closest to the model of the other side (for example, the substrate) and rigidity therebetween when the multilayer component shell model whose element division line position is different from that of the multilayer substrate shell model is bonded in a mounting position of the component to the surface of the multilayer substrate shell model, a step (D-2) for forming an analysis model by bonding a neutral substrate plane computed from the multilayer substrate shell model and a neutral component plane computed from the multilayer component shell model with a bonding element equivalent to mounting conditions of the component and the intermediate bonding file, and a step (E) for computing deformation by applying boundary conditions to the analysis model. The step (B) can be arranged before the step (A).

Figure 22A:
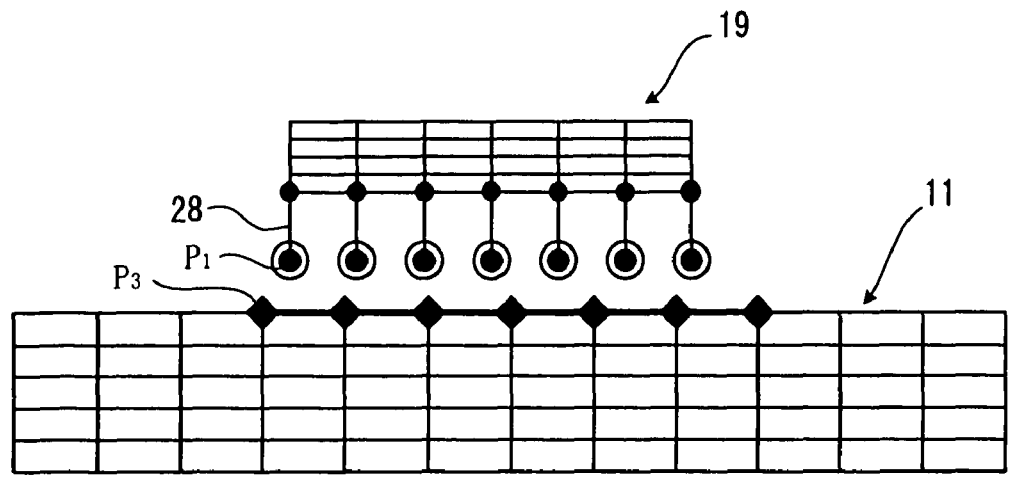
FIGS. 22(a)-22(b) are explanatory views showing an intermediate bonding file of FIG. 21.
Figure 22B:
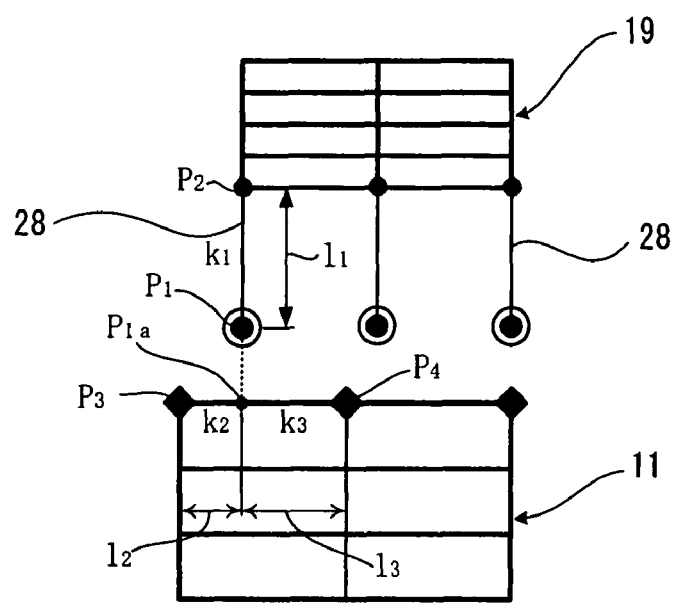

Specifically, the mesh of element division lines in a component mounting position of the multilayer substrate shell model 11 is different from that of the multilayer component shell model 19, the multilayer substrate shell model 11 and the multilayer component shell model 19 to be connected in the step (D-2) as shown in FIG. 22(*a*). For this reason, the step (F) creates the intermediate bonding file by considering distances of l1, l2 and l3 and rigidities of k1, k2 and k3 when a position of the multilayer substrate shell model 11 abuts an end P1 of the beam element 28 is set to P1*a*, mesh intersections of element division lines in the multilayer substrate shell model 11 are set to P3 and P4, a distance between the position P1*a* and the intersection P3 is set to l2, the rigidity between the position P1*a* and the intersection P3 is set to k2, the distance between the position P1*a* and the intersection P4 is set to l3, and the rigidity between the position P1*a* and the intersection P4 is set to k3, if the end of the beam element 28 connected in a position P2 of an external connection terminal 21 of the multilayer component shell model 19 is P1, the length of the beam element 28 is l1, the rigidity of the beam element 28 is k1, and the multilayer component shell model 19 is mounted in a component mounting position of the multilayer substrate shell model 11 as shown in FIG. 22(*b*).

In the step (D-2), the neutral substrate plane 14 computed from the multilayer substrate shell model 11 and the neutral component plane 26 computed from the multilayer component shell model 19 are bonded with a bonding element equivalent to mounting conditions of the component and the intermediate bonding file. Accordingly, the force generated at the connection point P1*a* is distributed to the intersections P1, P3 and P4, such that a state can be made which is equivalent to a state in which the mesh of element division lines in the component mounting position of the multilayer substrate shell model 11 corresponds to that of the multilayer component shell model 19 and therefore a target analysis model can be obtained without performing redivision. In the step (E), deformation is computed by applying boundary conditions to the analysis model created in the step (D-2). The step (B) of FIG. 21 can be arranged before the step (A).

In the step (D-2), the analysis model 29 is provided in which the neutral substrate plane 14 of the multilayer substrate shell model 11 and the neutral component plane 26 of the multilayer component shell model 19 are bonded with the beam element serving as the bonding element as shown in FIG. 25. Alternatively, when the multilayer wiring board and the component are bonded with a bump such as a solder ball and the like, the analysis can be performed through boding using the intermediate bonding file even when there is used the analysis model 29 bonded with the solid element 31 as shown in FIG. 26 rather than the beam element 28 for the bonding element.

The intermediate bonding file is used also in the cases of FIG. 18 and FIG. 20 like FIG. 21.

Figure 23:
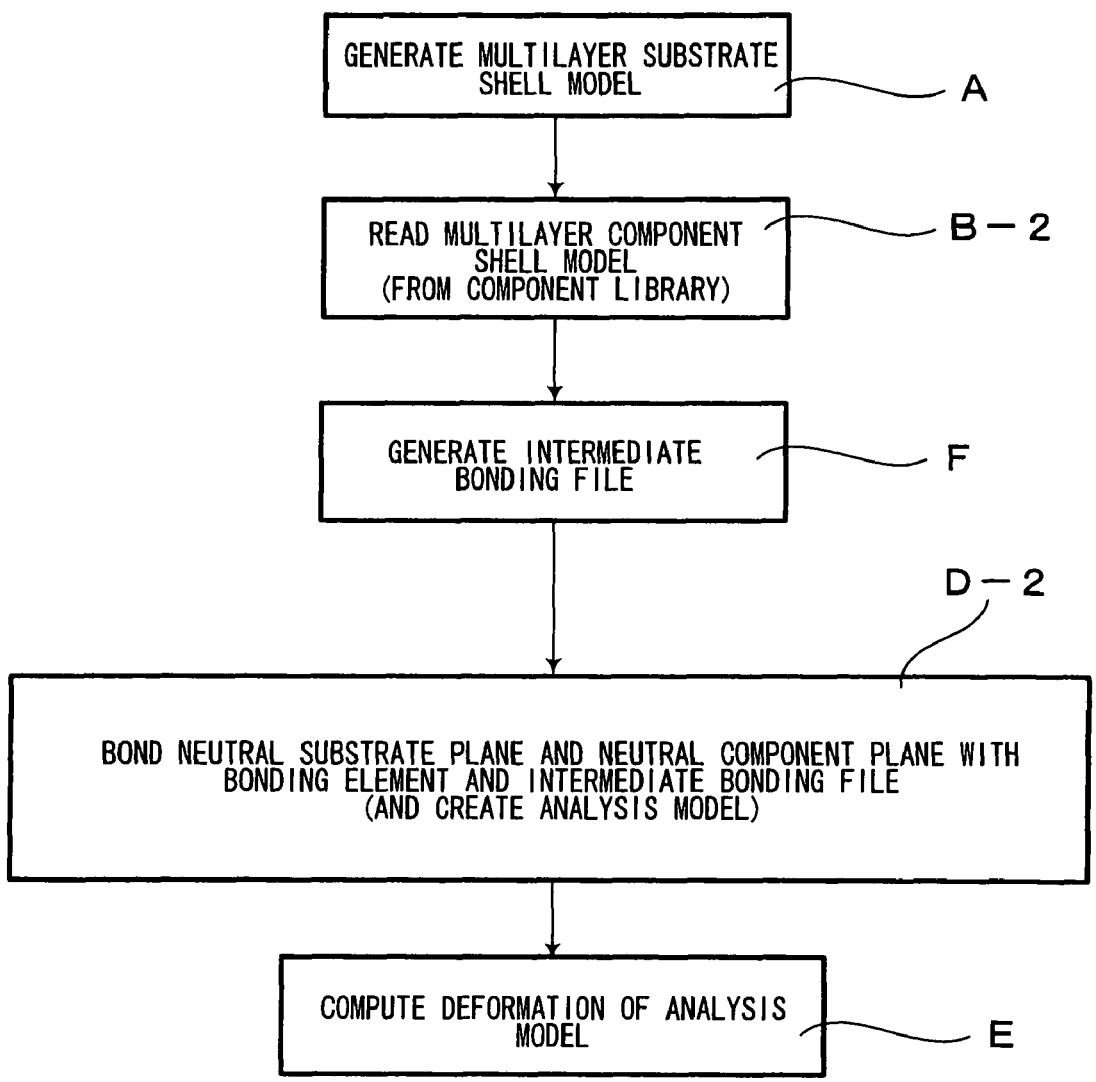
FIG. 23 is a view corresponding to Claim 11.

As shown in FIG. 23 in the case of FIG. 18, a step (A) generates single layer models of layers internally divided by element division lines on the basis of an external geometry of the multilayer wiring board and wiring patterns of the layers and generates a multilayer substrate shell model in which the single layer models of the layers are stacked in the geometry of the multilayer wiring board using thickness information of each of the layers of the multilayer wiring board. A step (B-2) reads a multilayer component shell model from a component data library recording the multilayer component shell model, mapped to each component, element-divided on the basis of an external geometry and internal structure of the component and a bonding division line passing through the bonding position of the component to the surface of the multilayer wiring board. A step (F) generates an intermediate bonding file to connect an intersection of element division lines of a model of one side of the multilayer substrate shell model and the multilayer component shell model with an intersection of element division lines closest to the model of the other side on the basis of a distance from the intersection of element division lines closest to the model of the other side and rigidity therebetween when the multilayer component shell model whose element division line position is different from that of the multilayer substrate shell model is bonded in a mounting position of the component to a surface of the multilayer substrate shell model. A step (D-2) forms an analysis model by bonding a neutral substrate plane computed from the multilayer substrate shell model and a neutral component plane computed from the multilayer component shell model with a bonding element equivalent to mounting conditions of the component and the intermediate bonding file. A step (E) computes deformation by applying boundary conditions to the analysis model. The step (B-2) of FIG. 23 can be arranged before the step (A).

Figure 24:
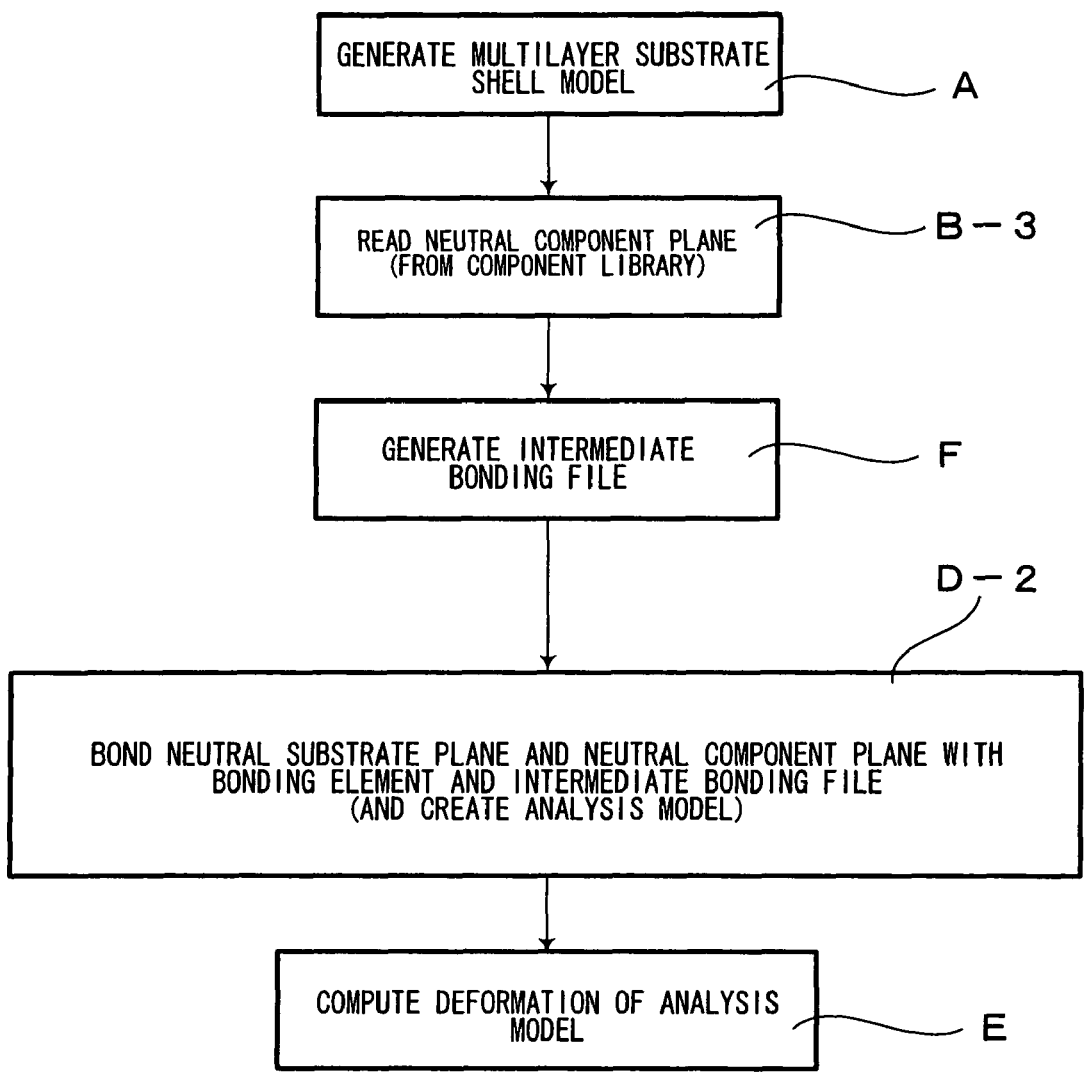
FIG. 24 is a view corresponding to Claim 12.

As shown in FIG. 24 in the case of FIG. 20, a step (A) generates single layer models of layers internally divided by element division lines on the basis of an external geometry of the multilayer wiring board and wiring patterns of the layers and generates a multilayer substrate shell model in which the single layer models of the layers are stacked in the geometry of the multilayer wiring board using thickness information of each of the layers of the multilayer wiring board. A step (B-3) reads a neutral component plane from a component data library recording the neutral component plane, mapped to the component, computed from a multilayer component shell model element-divided on the basis of an external geometry and internal structure of the component and a bonding division line passing through a bonding position of the component to the surface of the multilayer wiring board. A step (F) generates an intermediate bonding file to connect an intersection of element division lines of a model of one side of the multilayer substrate shell model and the multilayer component shell model with an intersection of element division lines closest to the model of the other side on the basis of a distance from the intersection of element division lines closest to the model of the other side and rigidity therebetween when the multilayer component shell model whose element division line position is different from that of the multilayer substrate shell model is bonded in a mounting position of the component to a surface of the multilayer substrate shell model. A step (D-2) forms an analysis model by bonding a neutral substrate plane computed from the multilayer substrate shell model and the neutral component plane computed from the multilayer component shell model with a bonding element equivalent to mounting conditions of the component and the intermediate bonding file. A step (E) computes deformation by applying boundary conditions to the analysis model. The step (B-3) of FIG. 24 can be arranged before the step (A).

In the step (D-2), the analysis model 29 is provided in which the neutral substrate plane 14 of the multilayer substrate shell model 11 and the neutral component plane 26 of the multilayer component shell model 19 are bonded with the beam element serving as the bonding element as shown in FIG. 25. Alternatively, when the multilayer wiring board and the component are bonded with a bump such as a solder ball and the like, the analysis can be performed through boding using the intermediate bonding file even when there is used the analysis model 29 bonded with the solid element 31 as shown in FIG. 26 rather than the beam element 28 for the bonding element. A bonding point of one bump is shown in FIG. 26, but there are bonding points of solid elements 31 whose number corresponds to the number of bumps.

In the embodiments as described above, a program for analyzing a component mounting board to operate the electronic computer 6 for performing a method for analyzing a component mounting board can be recorded and distributed in a recording medium. Moreover, the program can be distributed to a terminal via an Internet link and can be installed and operated in the electronic computer.

Figure 27A:
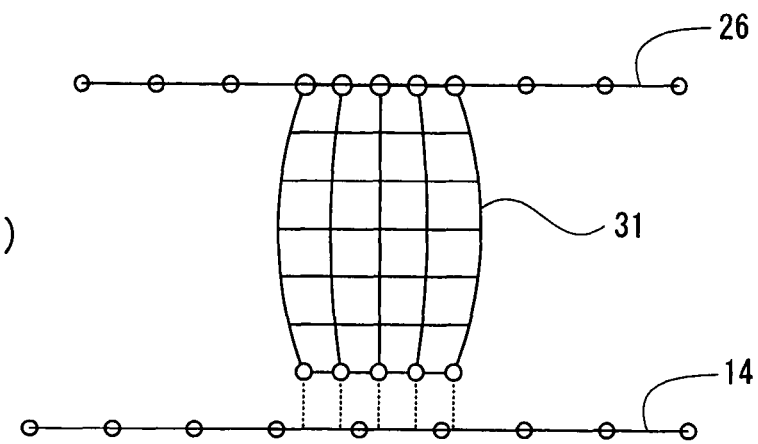
FIGS. 27(a)-27(c) are explanatory views showing the case where the neutral substrate plane 14 and the neutral component plane 26 are bonded with the solid element.
Figure 27B:
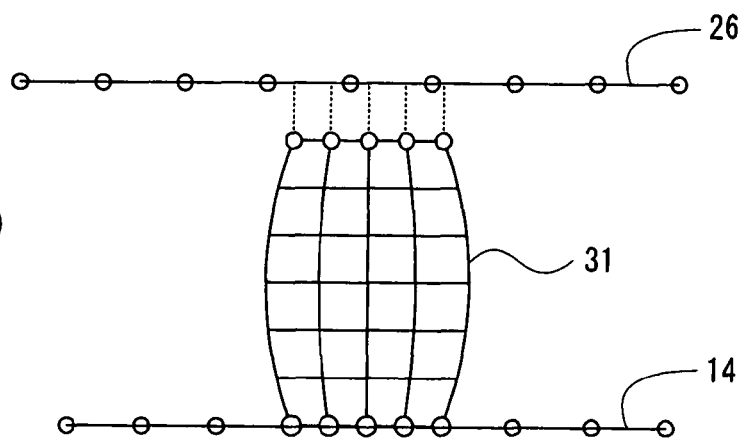
Figure 27C:
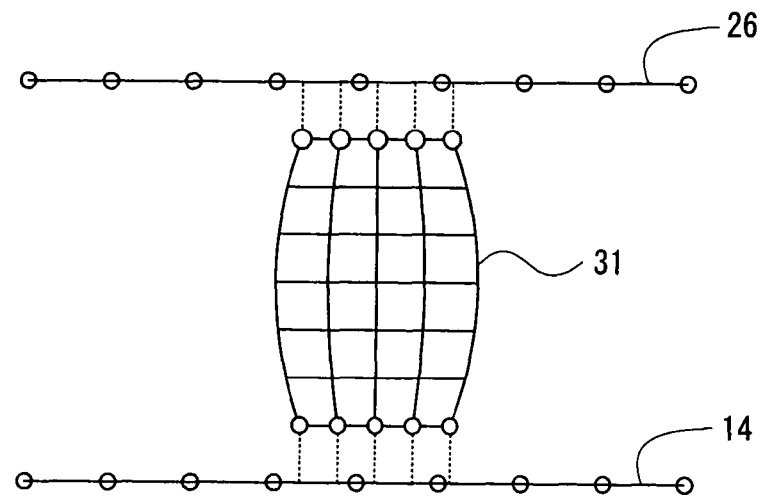

When the solid element 31 is used for the bonding element in the embodiments as described above, a specific example of using the intermediate bonding file is shown in FIG. 27(a), FIG. 27(b) and FIG. 27(c). In this embodiment, a contact-bonding portion bonded by matching nodes in a computation process using the intermediate bonding file is separately shown in the drawings. A three-dimensional shape of the solid element 31 of a bump such as a solder ball is a cylinder shape as shown in FIG. 26 or a cylinder shape whose central portion is expanded as shown in FIG. 27. Nodes at the component side of the solid element 31 and nodes at the substrate side of the solid element 31 are arranged in a concentric circle shape.

FIG. 27(a) shows the case where the nodes at the component side of the solid element 31 match those at the neutral component plane 26 of the multilayer component shell model 19, but the nodes at the substrate side of the solid element 31 do not match those of the neutral substrate plane 14 of the multilayer substrate shell model 11. In this case, a node at the substrate side of the solid element 31 is connected in equivalence with a node of the neutral substrate plane 14 of the multilayer substrate shell model 11 using the intermediate bonding file.

FIG. 27(b) shows the case where the nodes at the substrate side of the solid element 31 match those of the neutral substrate plane 14 of the multilayer substrate shell model 11, but the nodes at the component side of the solid element 31 do not match those of the neutral component plane 26 of the multilayer component shell model 19. In this case, a node at the component side of the solid element 31 is connected in equivalence with a node of the neutral component plane 26 of the multilayer component shell model 19 using the intermediate bonding file.

FIG. 27(c) shows the case where the nodes at the component side of the solid element 31 do not match those of the neutral component plane 26 of the multilayer component shell model 19, and the nodes at the substrate side of the solid element 31 do not match those of the neutral substrate plane 14 of the multilayer substrate shell model 11. In this case, a node at the substrate side of the solid element 31 is connected in equivalence with a node of the neutral substrate plane 14 of the multilayer substrate shell model 11 using the intermediate bonding file, and a node at the component side of the solid element 31 is connected in equivalence with a node of the neutral component plane 26 of the multilayer component shell model 19 using the intermediate bonding file.

Figure 28A:
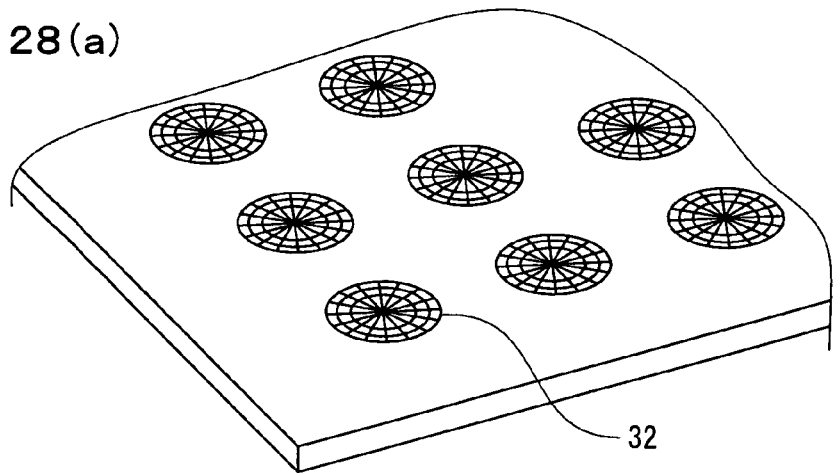
FIGS. 28(a)-28(c) are explanatory views showing a process for redividing a substrate multilayer shell model 11 on the basis of a node of the board side of a solid element 31.
Figure 28B:
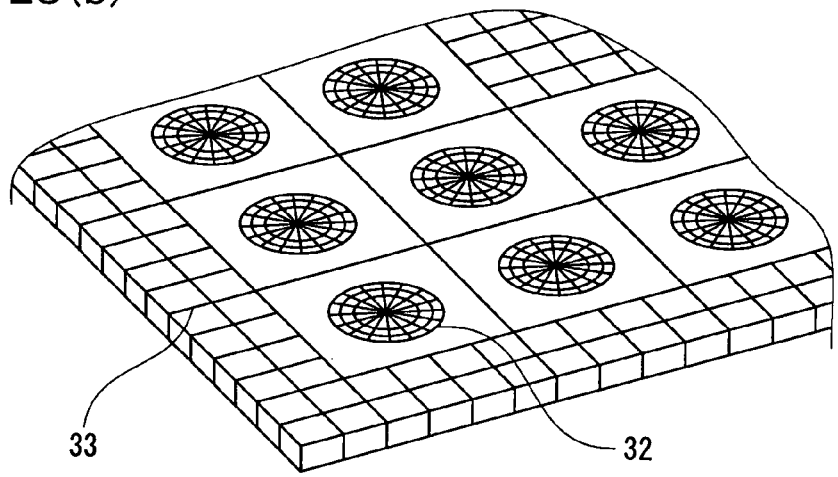

When the nodes at the substrate side of the solid element 31 do not match those of the neutral substrate plane 14 of the multilayer substrate shell model 11, a connection can be made by redividing the multilayer substrate shell model 11 with reference to the nodes at the substrate side of the solid element 31 without use of the intermediate bonding file. Specifically, a node 32 matching a node at the substrate side of the solid element 31 is determined for the n-th layer on the top of the multilayer wiring board as shown in FIG. 28(a). An area, which does not correspond to the node 32, is redivided by an element division line 33 in each layer on the basis of an external geometry of the multilayer wiring board and a wiring pattern of each layer as shown in FIG. 28(b). A remaining area undivided around each node 32 in FIG. 28(a) and FIG. 28(b) is redivided by a division line 34 and therefore a single layer model is generated. Similarly, the (n−1)-th layer, . . . , the second layer and the first layer are redivided. A multilayer substrate shell model in which single layer models of completely redivided layers are stacked is generated in the geometry of the multilayer wiring board using thickness information of each of the layers of the multilayer wiring board. The neutral substrate plane 14 of the multilayer substrate shell model 11 completed by redivision is used for analysis.

Figure 28C:
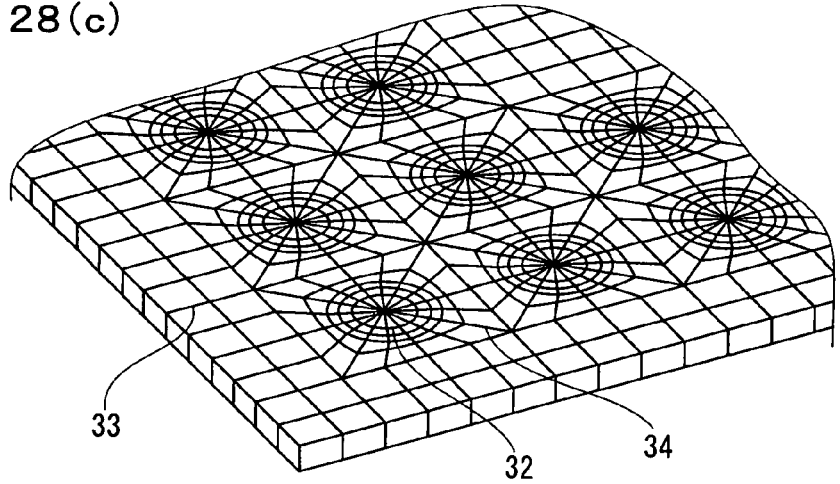

When nodes at the component side of the solid element 31 do not match those of the neutral component plane 26 of the multilayer component shell model 19, the multilayer component shell model 19 is determined with reference to nodes at the component side of the solid element 31 and each node 32 matching the node at the component side of the solid element 31 is determined as shown in FIG. 28. An area, which does not correspond to the node 32, is redivided by an element division line based on the component. A remaining area undivided around each node 32 is redivided, such that single layer models are generated. A component shell model is generated by stacking the single layer models in the geometry of the component. The neutral component plane 26 of the multilayer component shell model 19 completed by the redivision is used for analysis and the connection can be made without use of the intermediate bonding file.

INDUSTRIAL APPLICABILITY

The present invention can obtain analysis results for stress analysis of a plate-like body such as a multilayer wiring board, a semiconductor integrated circuit, or the like in a shortened time using a small number of computation steps. In particular, the invention is effective to change or correct computer-aided design (CAD) data in a design process and to change or correct computer-aided manufacturing (CAM) data in a production process.

The invention claimed is:

1. A method for analyzing physical properties of a component mounting board, whereon a component is mounted to a surface of a multilayer wiring board, the method comprising:

generating electronic single layer models of layers of a multilayer wiring board which layers are internally divided into three-dimensional elements by a first set of element division lines, and including exclusive information about each such layer, on a basis of an external geometry of the multilayer wiring board and wiring patterns of the layers;

generating an electronic multilayer substrate shell model in which the single layer models of the layers are stacked in the geometry of the multilayer wiring board using thickness information for each of the layers of the multilayer wiring board;

generating an electronic multilayer component shell model based on a bonding position of a component to the surface of the multilayer wiring board divided into two-dimensional elements by a second set of element division lines;

electronically generating a mounting position of a component of a multilayer substrate shell model by redividing the three-dimensional elements defined by the first set of element division lines used in generating the multilayer component shell model;

forming an electronic analysis model of a mounting board with a component thereon, by connecting a neutral substrate plane computed from the redivided multilayer substrate shell model and a neutral component plane computed from the multilayer component shell model with a bonding element representing a component mounted on such a board; and computing deformation of such a model mounting board by applying stress conditions to the analysis model.

2. The method for analyzing the component mounting board according to claim 1, wherein forming the electronic analysis model by connecting the neutral substrate plane and the neutral component plane with a bonding element representing a component mounted on such board comprises:

computing the electronic analysis model by connecting a node of a resin bonding material area, excluding a node connected with one of the bonding element between the multilayer substrate shell model and the multilayer component shell model, with a bonding element having a mechanical strength equivalent to that of a resin bonding material of the resin bonding material area.

3. A method for analyzing physical properties of a component mounting board, whereon a component is mounted to a surface of a multilayer wiring board, the method comprising:

generating electronic single layer models of layers of a multilayer wiring board which layers are internally divided into three-dimensional elements by a first set of element division lines, and including exclusive information about each such layer, on a basis of an external geometry of the multilayer wiring board, wiring patterns of the layers and a position of a land to which the component is surface-mounted;

generating an electronic multilayer substrate shell model in which the single layer models of the layers are stacked in the geometry of the multilayer wiring board using thickness information of each of the layers of the multilayer wiring board;

generating an electronic multilayer component shell model divided into two-dimensional elements by a second set of element division lines based on a bonding position to the surface of the multilayer wiring board of the component;

forming an electronic analysis model of a mounting board with a component thereon, by connecting a neutral substrate plane computed from the multilayer substrate shell model and a neutral component plane computed from the multilayer component shell model with a bonding element representing a component mounted on such a board; and computing deformation of such a model mounting board by applying stress conditions to the analysis model.

* * * * *